Sept. 25, 1962  H. B. SEDGFIELD  3,055,223
HIGH-ACCURACY GYROSCOPIC APPARATUS
Filed Feb. 11, 1954  7 Sheets-Sheet 1

INVENTOR
HUGH B. SEDGFIELD
BY
ATTORNEY

INVENTOR
HUGH B. SEDGFIELD
BY
Herbert H. Thompson
ATTORNEY

United States Patent Office 3,055,223
Patented Sept. 25, 1962

3,055,223
HIGH-ACCURACY GYROSCOPIC APPARATUS
Hugh Brougham Sedgfield, Hampton, England, assignor to The Sperry Gyroscope Company Limited, Middlesex, England, a company of Great Britain
Filed Feb. 11, 1954, Ser. No. 409,606
18 Claims. (Cl. 74—5.37)

The object of this invention is to realise a precision, or low-wander-rate, gyroscope.

It is well known that a gyroscope tends to maintain its axis of rotation in a fixed direction in space, and that the direction of the axis will only wander from its initial direction if disturbing torques act on it. In some gyroscopes torque-applying means are included which operate to apply torques of predetermined magnitudes which are intended to cause the gyroscope to precess at known rates. Whether such intentional control torques act on the gyroscope or not, there are always, in all practical gyroscopic apparatus, undesired disturbing torques that act on the gyroscope, with the result that the disturbing torques cause the gyroscope to precess so that the direction of the axis "wanders" from the fixed direction that it should maintain if no intentional torques are operating, or, if the latter are operating, from the intended path or type of precessional motion that it should follow in response to the intentionally applied precessing torques. "Wander" may thus be defined as the precession of a gyroscope due to undesired disturbing torques, which precession may or may not be additional to a desired state or programme of precession due to the action of intentionally applied control torques. The rate at which a gyroscope wanders, or is liable to wander under operational conditions, is a measure of the quality of the gyroscope, a crudely constructed gyroscope generally having a high wander rate, and a high-accuracy, or precision, gyroscope having a low wander rate.

The disturbing torques that cause a gyroscope to wander may be divided into a number of classes according to the causes that produce them. Among such causes are frictional torques arising from friction between relatively moving elements of the gyroscope due to relative movement of the gyroscope and a support such as a vehicle or craft on which the gyroscope is carried, gravity torques due to unbalance of some member of the gyroscope about a pivot axis, torques of restraint applied by various constraining elements such as filaments, diaphragms, etc., by means of which parts of the gyroscope may be suspended from, or mounted in, other parts or supports, acceleration torques arising when the vehicle, or other support on which the gyroscope is carried, undergoes acceleration in space, and external torques due to the action on parts of the gyroscope of external forces or fields of force, such as magnetic fields, air currents, and the like.

In general, the disturbing torques due to each of these causes may be subdivided into two classes according to the mode of their occurrence in time, namely, into erratic and systematic torques, and the precession of the gyroscope due to them may similarly be classified as erratic with systematic precessional or wandering movements. Whether the torque due to any one kind of disturbing cause is mainly erratic or mainly systematic depends very greatly on the design and construction of the gyroscope and its parts. For example, the disturbing gravity torques due to unbalance of a pivotally supported element of the gyroscope about its pivot axis may be erratic if the centre of gravity of the supported element is not accurately located with respect to its pivotal axis of support, as, for example, if there is play in the bearing for that pivot axis, or in the bearing for the axis of support of some other element of the gyroscope. When this is the case it is possible for the element that is supported with play in the bearings to assume any one of a number of possible positions within the range of movement permitted by the play in the bearings, and it may change erratically from one position to another in response to accidental circumstances; the weight of the element acting downwards about one of the pivot axes by which the element is supported may then be laterally displaced from the pivot axis and exert a torque about it, this torque therefore being liable to vary erratically and to produce in consequence an erratic wander of the gyroscope that may change erratically from time to time.

In gyroscopes of normal construction in which one or more of the pivot axes by which the rotor is mounted with freedom to spin, and with freedom of the spin axis to precess, is provided by plain or ball bearings, the possible occurrence of erratic precessional torques and consequently of erratic wander rates of the gyroscope has been the effective limitation to accuracy of the gyroscope. In gyroscopes of these designs attempts to improve accuracy of the gyroscope, that is to secure low wander rates, have been directed to achieving high accuracies in manufacture, particularly in ball-bearings, measures to take up play in bearings, and the like. Systematic errors could in general be detected and compensated for to as high an accuracy as was observable in the presence of the erratic errors.

It has been found possible by using special methods of support for sensitive elements (e.g. gimbal rings) of the gyroscope, to reduce very greatly the magnitude of any possible shift of the centre of gravity of the supported element relative to a gimbal axis or axes of pivotal support compared to the shifts obtained when the sensitive element is supported by means of plain journal bearings or of ball bearings, and therefore to reduce very greatly erratic wander rates due to this cause as compared even with the best gyroscopes of normal designs. For the purpose of the present specification we shall refer to gyroscopes using special suspensions that achieve such reductions in erratic wander rate as non-erratic gyroscopes, even though erratic wander rates may be present of a very low order of magnitude.

For example, in the specification of application No. 147,444, filed by applicant, John Alfred Taylor and Daniel MacDougall on March 3, 1950, and now abandoned for Gyroscopic Apparatus, there is described a gyroscope in which the sensitive element is supported totally immersed in liquid, with its centre of gravity substantiall coincident with the centre of flotation of the flotation forces acting on the sensitive element. Since the centre of flotation is the centre of support determined by the contour of the external surface of the floating element, which in this design is a figure of revolution, the shift that can take place between the centre of gravity and the centre of flotation, even if the vehicle or craft on which the gyroscope is carried becomes angularly displaced about the gyroscope, or even if the vehicle or craft undergoes acceleration, can be made extremely small. Frictional forces, which, in ordinary constructions, may give rise to erratic torques, are also reduced to a minimum.

In other proposed methods of realising a high-accuracy gyroscope, e.g. in that disclosed in application No. 357,056, filed by applicant on May 25, 1953, and now Patent No. 2,852,943 for Gyroscopic Apparatus, the sensitive element or elements of the gyroscope are supported by means of diaphragms, or ligaments, from follow-up members, so that no frictional forces arise due to angular displacement of the vehicle or craft round the gyroscope. In such constructions the diaphragms and ligaments may sometimes apply torques or constraint during angular movements of the craft or during periods of lag of the follow-up members in following the sensitive element, but by careful design and by the closest accuracy in manufacture these may be rendered quite small, and any erratic torques due to them may be rendered very small.

In non-erratic gyroscopes constructed in accordance with such techniques it is found that the erratic wander rates become so low that it is the systematic wander rates and systematic disturbing torques that become the chief difficulty. If these were truly and accurately constant in all conditions, it should be possible to neutralise them by employing accurate methods of balancing and of applying compensating torques to cancel measured wander rates. To do this in general involves new techniques in balancing and control of variable parameters which may be quite difficult to carry out. When this is done it is found that a large part of the systematic disturbing torques may be compensated for, so that a large part of the systematic wander rate is cancelled, but that a residue is left which cannot be dealt with in this way. These residual wander rates are, in general, constant, or vary very slowly in any one run of the gyroscope, but, after a cycle of operation in which the gyroscope is started, run, slowed down, and stopped, it may be found that in the next cycle of operation, after the gyroscope has started and has run up to speed, the residual systematic errors and wander rates are different from those obtaining in the first run. In effect, the residual errors vary erratically from one run to another, or vary very slowly during a run, but it is convenient to refer to them as systematic because they act as systematic errors during any one run, and because this terminology serves to point a contrast with the erratic errors present in gyroscopes of normal construction which vary erratically within a single run.

It is to be appreciated that in gyroscopes of the non-erratic kinds under discussion, that is, in gyroscopes in which the chief causes of erratic wander rate have been eliminated, the systematic wander rates that cannot be balanced out are smaller by a whole order of magnitude than the erratic wander rates that occur in the best gyroscopes of normal construction.

The aim of the present invention is to provide gyroscopic apparatus in which a reference direction is determined with a still high order of accuracy, that is, with an accuracy that is an order of magnitude higher than is obtainable even with the improved gyroscopes referred to in which erratic wander rates have been eliminated. A feature of the invention is that it enables these high accuracies to be attained with an azimuth gyroscope, that is, with a gyroscope having a horizontal, or nearly horizontal, spin axis. Such gyroscopes are particularly susceptible to systematic wander rates due to gravity torques, since a longitudinal displacement of the rotor along its horizontal spin axis brings into operation a gravity torque acting about the pivot axis of support by which the rotor or the combination of the rotor and a rotor casing, may be mounted with freedom to tilt, with the consequence that the gyroscope precesses or wanders continually in azimuth, and, even if the longitudinal displacement permitted by the play in the bearings is extremely small (of the order, say, of .0001 inch), this displacement is in a horizontal direction and the disturbing gravity torque brought into play by the unbalanced condition is therefore the whole weight of the rotor acting on a lever arm equal to the full value of this displacement. This torque is sufficient to produce precession of the gyroscope at a wander rate far in excess of the limiting value permissible for some desired applications of gyroscopic apparatus.

In the improved gyroscopic apparatus of the present invention a gyroscope (preferably one that is inherently free from liability to wander erratically) is employed having switching arrangements associated with the means for supplying power to spin the rotor, these switching arrangements being adapted to control the supply of power to the rotor in such a manner as to cause the rotor, during alternate recurrent periods, to spin in one sense, and in the intervening periods to spin in the reverse sense about its spin axis.

It will be clear that, if a constant torque, or one that changes very slowly during a period containing a considerable number of cycles of operation of the switching arrangements, for example, a gravity torque due to unbalance of the gyroscope about a pivot axis, is operative on the reversing gyroscope of the invention to cause it to precess, then this precession, or the component of the precession that is due to this torque, will be in one direction when the gyroscope is spinning in one sense about its spin axis, and will be in the opposite direcon when the gyroscope is spinning in the opposite sense about its spin axis. The total precession over a large number of cycles will therefore be much smaller than if the gyroscope were spinning continuously in the same sense about its spin axis while subject to the same constant torque.

A gyroscope according to the invention may or may not be subjected to the action of intentionally applied control torques. It will not be subjected to control torques if the gyroscope is intended to maintain its axis in a substantially fixed direction in space, so that it may act as a fixed-direction reference line, but it will be subjected to control torques if it is intended that the axis of the gyroscope should precess relatively to space axes. In the latter case control means will be provided that apply whatever torques are appropriate to cause the gyroscope to precess at each instant at the desired rate and in the desired direction. The axis of the gyroscope may then be taken as a moving reference line which, in the absence of disturbing torques, will turn in space in a predetermined manner defined by the control torques applied.

According to the terminology used in the present specification, controlled precession of a gyroscope produced in dependence on intentionally applied control torques is not reckoned as wandering of the gyroscope, this term being reserved for undesired disturbing torques. In general, wander due to such disturbing torques is additive to any controlled precession that may be produced by intentionally applied control torques, so that the measures that are useful in reducing wander rate in a gyroscope intended to act as a fixed-direction reference line are also applicable, and are just as useful and important, in a gyroscope intended to act as a changing-direction reference line in which the change of direction is to be produced in accordance with applied control torques.

As has already been mentioned, a reversible gyroscope according to the invention will wander in response to a constant or substantially constant disturbing torque very much less over a long period than will a constantly spinning gyroscope. It can therefore serve to provide a fixed or angularly moving reference direction with greater accuracy over a period of several cycles of gyroscope reversal than can a constantly spinning gyroscope. However the reversing gyroscope cannot be relied on as a directional reference during the whole of its cycle of operation. In particular it cannot be relied on during that part of its cycle of operation in which the reverse spinning torque applied to the rotor to reverse the spin of the rotor has considerably reduced the spin velocity and then acts first to stop and then to reverse the spin. This is because the gyroscope then has very low angular momentum and is consequently very sensitive to torques applied to it, so that it may wander at a relatively fast rate even in response to low residual disturbing torques.

For this reason, in order to ensure satisfactory operation of gyroscopic apparatus containing, in accordance with the invention, a periodically reversing gyroscope, or means for periodically reversing a gyroscope, one or more additional gyroscopes will be present by which the direction of the reference line defined by the reversible gyroscope may be determined or maintained at such time as the reversing gyroscope of the invention is having its velocity reduced to zero and reversed, and, more particularly, at times when this gyroscope is spinning with only a low spin velocity or has ceased to spin.

Since the additional gyroscope (or gyroscopes) is to be used to control or maintain the reference direction during the periods of low, or zero, spin velocity of the reversing gyroscope, this gyroscope also should be a high-accuracy gyroscope employing a suspension that renders the gyroscope free from disturbing torques of the kind that give rise to erratic wander. However, such a gyroscope is liable to wander continuously in one direction at a substantially constant rate, producing cumulative wandering of the reference line.

One possible method of preventing cumulative wandering during the periods of control exercised by the additional gyroscope or gyroscopes is to employ for the additional gyroscope one that is itself arranged to reverse its direction of spin periodically, these reversals occurring at the same frequency as those of the primary reversing gyroscope and at times so chosen that the periods at which the gyroscopes are running at their full running speed overlap each other. The control of the reference line may then be switched alternately from one gyroscope to another in such a way that during those intervals in which one of the gyroscopes is having its spin accelerated or retarded control of the reference line is switched to the other gyroscope, or to one of the other gyroscopes, at a time when that gyroscope is running at its full operational speed, the switching being so effected that each gyroscope that is put into control of the reference line exercises control for two equal periods of time in which it is running at full rotor speed in its two directions of rotor spin respectively.

In this possible method of putting the invention into effect the average wander rate over a long period in response to a constantly acting disturbing torque may be made substantially zero owing to the repeated reversals of the direction of wander, so that the reference line defined by the gyroscopic system is maintained to correspond to the desired fixed or angularly moving direction to within a very small angular error, even although the rate of wander of the gyroscope and therefore of the reference line defined by it may, throughout certain time intervals constituting appreciable fractions of the period of a cycle of gyroscope reversal, have the full value of the instantaneous wander rate of one of the gyroscopes in response to the disturbing torque acting on it.

Preferably however the gyroscopic apparatus is designed to embody another feature of the invention according to which there is provided means for detecting any tendency of the additional gyroscope to wander relatively to the mean direction defined by the primary reversing gyroscope and means for applying a torque of controllable magnitude to the additional gyroscope or gyroscopes so that the torque is, or can be rendered, of the correct value to neutralise that wander. In this way the additional gyroscope, after an initial period in which its tendency to wander is being detected and the compensating torque is being adjusted to the correct value, is rendered substantially free from wander due to the constant or systematic disturbing torque.

In apparatus in which the invention is thus carried out, the auxiliary gyroscope may be used at all times after the initial period referred to as the means for defining a reference direction and the reversing gyroscope may then be regarded as a primary direction-giving instrument for initially setting and perhaps also for subsequently monitoring the auxiliary gyroscope. To enable these results to be achieved the invention preferably takes the form of apparatus in which a gyroscope arranged to have its direction of spin reversed periodically during operation of the apparatus has associated with it an auxiliary or holding gyroscope arranged for spinning in one sense continuously about a spin axis that is, or that may be set, substantially parallel to the spin axis of the reversing gyroscope and in which a controller is provided adapted to apply a constant torque of controllable magnitude and sense to the auxiliary gyroscope the magnitude and sense of which are dependent on the setting of a device in the controller or on the value of a quantity stored in the controller.

For example, the torque-applying means may include a torque-motor operating on the auxiliary gyroscope and a manually adjustable setting device that controls the supply of power to energise the torque motor. The correct setting of the torque-applying device may then be determined by an observer or operator from observation in which the extent to which the auxiliary gyroscope wanders relatively to the reversing gyroscope in a period in which the rotor of the latter gyroscope is spinning in one direction is compared with the extent of its wander relative to the reversing gyroscope in a corresponding period in which the rotor is spinning in the reverse direction. In one of these two periods the reversing gyroscope will be wandering relatively to space, or inertial, axes in one direction, and in the other period it will be wandering in the opposite direction in both cases at the same characteristic rate, provided that the spin velocity of the rotor is the same in both cases, but in both periods the auxiliary gyroscope will be wandering in the same direction at its own characteristic rate. Consequently the two gyroscopes will be wandering in the same direction in one of the two periods each at its own characteristic rate, so that the relative wander rate in this period, which is a quantity that can be measured will be the difference between the two characteristic rates. In the other period the two gyroscopics will be wandering in opposite directions each at its own characteristic rate, so that the relative wander rate in this period, which once again can be measured, will be the sum of the two characteristic rates. The algebraic mean of the two values found for the wander rate of the auxiliary gyroscope relative to the reversing gyroscope will then be a measure of the absolute wander rate of the auxiliary gyroscope. If this absolute wander rate is known to an operator using the apparatus he will be able to set the manual setting device to control the torque-applying device to apply to the auxiliary gyroscope whatever torque is necessary to compensate for and neutralise the systematic disturbing torque that is causing the auxiliary gyroscope to wander at the ascertained rate.

There are several possible ways by which the operator may obtain the information necessary to enable him to set the manual setting device correctly. For this purpose he may make observation on the two rates of wander of the auxiliary gyroscope relative to the reversing gyroscope e.g. by measuring the extents of the relative wander angles that develop during equal periods in which the two rates of wander are operative, so as to determine the mean rate of wander and he may then set the torque-applying device to the correct setting to compensate for and neutralise this wander. This he may do either directly by means of a previously calibrated scale associated with the setting device, or by successive trial and error.

So far, the above description has established only one use for the reversing gyroscope when used in combination with an auxiliary holding gyroscope, this use being confined to a few cycles of reversal of the reversing gyroscope effected after the apparatus is initially switched on during a preparatory period in which the apparatus is being adjusted prior to its actual use.

The utility demonstrated for the reversing gyroscope is that it enables the correct value of the compensating torque to be determined, that is to say, the magnitude and sense of the torque that should be applied to the auxiliary gyroscope to compensate and neutralise the systematic disturbing torque that is effectively in operation during the particular run of the apparatus. Once the manual controller has been set to control the application of the correct compensating torque, this torque will continue to be applied. Consequently the auxiliary gyroscope should remain corrected and thus be free from liability to wander. There would seem to be no further use of the reversing gyroscope during that run of the apparatus. However the reversing gyroscope is necessarily still present and further advantages can be obtained by continuing to use it to monitor the auxiliary gyroscope to determine whether any small changes occur in the systematic disturbing torque operating on the auxiliary holding gyroscope or perhaps in the compensating torque, resulting in failure of strict compensation and consequent slow wandering of the auxiliary gyroscope. Desirably any such slight departure from exact compensation should be shown on an indicator, or should bring into play automatic means for correcting the setting or stored quantity that determines the value of the compensating torque, in such a way that the changed magnitude of the systematic wander of the auxiliary gyroscope is once more neutralised. A method of effecting such automatic compensation based, like the above described method of effecting manual adjustment of the compensating torque, on comparison of the rate of wander of the auxiliary gyroscope relative to the reversing gyroscope in two corresponding periods of the reversing gyroscope when its direction of rotation is in one sense and in the reverse sense respectively, is described hereinafter.

When the invention includes such means for automatically effecting adjustments of the compensating torque applied to the auxiliary gyroscope, these means can clearly be used in the first few cycles of reversal of the reversing gyroscope to effect the initial adjustment of the compensating torque, so that the system is rendered fully automatic.

According to another feature of the invention a compensating torque may be applied, not only to the auxiliary gyroscope or gyroscopes, but also to the primary reversing gyroscope or gyroscopes, so that the characteristic wander rates of both the auxiliary and the reversing gyroscopes may be rendered substantially zero. According to this feature of the invention, therefore, means are provided for applying to the reversing gyroscope a compensating torque suitable for producing precession of the reversing gyroscope in a direction reversing with reversal of spin of the rotor and at a rate equal and opposite to the reversible wander that would be found to obtain if the compensating torque were not in operation.

For this purpose means are provided to determine the compensating torque that is to be applied to the reversing gyroscope in dependence on any algebraic difference that may exist between the two values of the wander rate at which the auxiliary gyroscope is found to wander relatively to the reversing gyroscope in two measuring periods occupying corresponding portions of alternate halves of each cycle of operation of the reversing gyroscope. If any such difference exists it will display itself as a cyclic variation in angles between the directions defined by the spin axes of the two gyroscopes, the angle changing in one sense in one half cycle of operation of the reversing gyroscope and in the opposite sense in the other half cycle. The compensating torque should be of such a value as to reduce this cyclic variation in angle to a minimum.

The torque applied to the reversing gyroscope, determined as has been described above, will be that which is correct to compensate for wander of the auxiliary gyroscope during the measuring periods in which the wander rates of the two gyroscopes are being compared to determine the value of this torque. However as this torque can be of the correct value only if it opposes and neutralises the systematic disturbing torque that was previously operating to cause the cyclically reversed wander of the gyroscope before the compensating torque was applied, it follows that this torque must also be of the correct value to neutralise wander of the reversing gyroscope during the intervals between the measuring periods, even although the speed of the rotor is changing in these intervals. Consequently the reversing gyroscope may be left free to precess during the whole period in which its rotor speed is being retarded and reversed, and the gyroscope should nevertheless be free from wander throughout this period, provided that the means that applies the compensating torque to it operates to apply the same torque when the rotor speed is changing at it does in the periods in which the relative wander rate of the two gyroscopes is being measured. Although, in theory, the reversing gyroscope should not wander during the changing-speed periods once the correct compensating torque has been developed and applied to it, it is best not to rely on this, because of the extreme liability of the gyroscope to precess readily in response to any slight unbalanced disturbing torque when the rotor spin velocity is very low at irregular wander rates, and thus to diverge appreciably from alignment with the auxiliary gyroscope. It is therefore preferable to confine the measuring periods solely to those parts of the cycle of operation of the reversing gyroscope in which the rotor of that gyroscope is spinning at its steady maximum speed.

For similar reasons it is desirable that the motors driving the rotors of the two gyroscopes should be arranged to run accurately always at the same speed when they are up to speed, and that this speed, in the case of the reversing gyroscope, should be the same for both directions of rotation. For this purpose the motors driving the gyroscopes may be A.C. motors, of types that become synchronous when their speed approaches synchronous speed, and the alternating-current source energising the rotors may be one that is frequently controlled.

It is clear from the above description that the compensating torques that have to be applied to the two gyroscopes are both derived from measures of the relative wander of the two gyroscopes. In boh cases the wander of the auxiliary gyroscope relative to the reversible gyroscope occurring in a first measuring period that is part of one half of a cycle of operation of the reversing gyroscope is compared with the corresponding wander of the auxiliary gyroscope occurring in a corresponding measuring period in the alternate half of the cycle of operation. The compensating torque applied to this auxiliary gyroscope is derived in dependence on the algebraic sum of the two relative wander rates found to obtain in the two measuring periods, and is applied to the auxiliary gyroscope to oppose the steady component of wander rate for which auxiliary gyroscope is responsible, and the compensating torque applied to the reversing gyroscope is derived in dependence on the algebraic difference between the two relative wander rates and is applied to the reversing gyroscope to oppose the cyclically varying component of the wander rate, for which the reversing gyroscope is responsible. In the case of the auxiliary gyroscope at least, and preferably also in the case of the reversing gyroscope, the compensating torque is applied by means that maintain the compensating torque in operation throughout the intervals between the measuring periods at substantially the same value of the torque as was obtaining in, or at the end of, the last measuring period. For this purpose measures of the compensating torques to be applied are obtained during the measuring periods and these are stored as stored control quantities in a form in which they can continue to exercise control of the torque-applying means to cause the latter to continue to apply compensating torques. For example, they may be stored in the form of settings of adjustable controllers such as potentiometers. It has been remarked that the reversing gyroscope is very susceptible to disturbing torque when its rotor speed is in the neighbourhood of zero, as occurs during each period in which the rotor speed is being retarded and reversed. In consequence, the reversing gyroscope may suffer irregular changes in its angular position with respect to the auxiliary gyroscope in different cycles of operation. This is particularly the case if demand torques are operating on the gyroscope intended to make it precess relatively to inertial, or Galilean, axes (sometimes referred to as space axes) in a prescribed manner. It is desirable to avoid such irregular changes in angular position of the reversing gyroscope to occur and be present during the measuring periods, since, if they are present, it becomes difficult to devise methods of measuring relative wander of the two gyroscopes during the measuring periods. According to another feature of the invention, therefore, means are provided for centralising the reversing gyroscope to a predetermined angular position with respect to the auxiliary gyroscope, preferably to a direction in which its spin axis is in line with, or parallel to, the spin axis of the auxiliary gyroscope before the beginning of each measuring period. For this purpose it is convenient to apply aligning torques to the reversing gyroscope after the rotor has been retarded and stopped, and either when it is accelerating again in the reverse direction, or after it has reached full speed in the reverse direction to cause the reversing gyroscope to precess into alignment with the auxiliary gyroscope.

By incorporating in this way a special regime in which auxiliary aligning torques operate on the reversing gyroscope alone during or following each measuring period, wandering of the reversing gyroscope during the reversing period is of little consequence.

As has been already stated, the invention may be applied in gyroscopic apparatus subjected to intentionally applied control torques to cause precession in a desired manner. It is often required that a reference line defined by a gyroscope should be turned relatively to inertial axes, and it is a well known measure to apply torques of known magnitude to the gyroscope about known axes to precess the gyroscope in the required manner.

For example a torque may be applied to cause the gyroscopes to precess in azimuth at a rate equal to the azimuth component of the earth's rotational velocity. This may be applied under the control of a manually adjusted controller or under the control of a computer to ensure that the torque has the correct value. Alternatively a torque may be applied under control of devices responsive to the occurrence of some condition. For example torques may be applied under the control of a gravity-actuated tilt detector to precess the gyroscope to maintain it or the platform on which it is carried level. Such measures are applicable to apparatus according to the present invention. For this purpose it is necessary to apply torques adequate to produce the required precession both to the reversing gyroscope and to the auxiliary gyroscope so that both are precessed together by these torques at substantially the same rate, at least during the measuring periods, so that the torques do not produce appreciable relative wandering of the gyroscopes during the measuring periods.

The invention, as so far described, operates to correct wander of both gyroscopes by measuring at any instant in one of the measuring periods the relative wander that has developed between the two gyroscopes during the interval that has elapsed between the start of the measuring period and that instant. A control quantity has to be set up proportional to this relative wander and has to be stored to control the application of a correcting torque to the gyroscopes not only during the measuring period but at the end of it. For this purpose the invention incorporates means for integrating the misalignment signal during each measuring period. This integrated signal or preferably a signal that is a combination of this integrated signal with the misalignment signal itself, is used as one of the two control quantities whose sum and difference are obtained to determine the torque to be applied to the two gyroscopes.

An embodiment of the invention will now be described with reference to the accompanying drawings in which.

Figure 1:
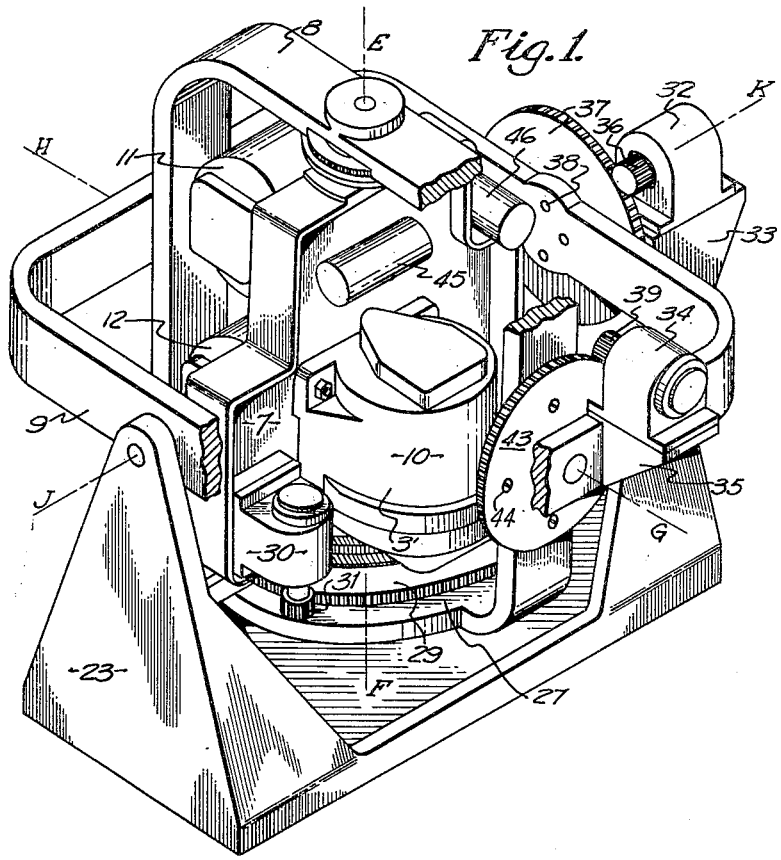
FIGURE 1 is a diagrammatic representation of a stabilised platform mounted in a gimbal ring system and having mounted on it gyroscopic apparatus in accordance with one embodiment of the invention.
Figure 10:
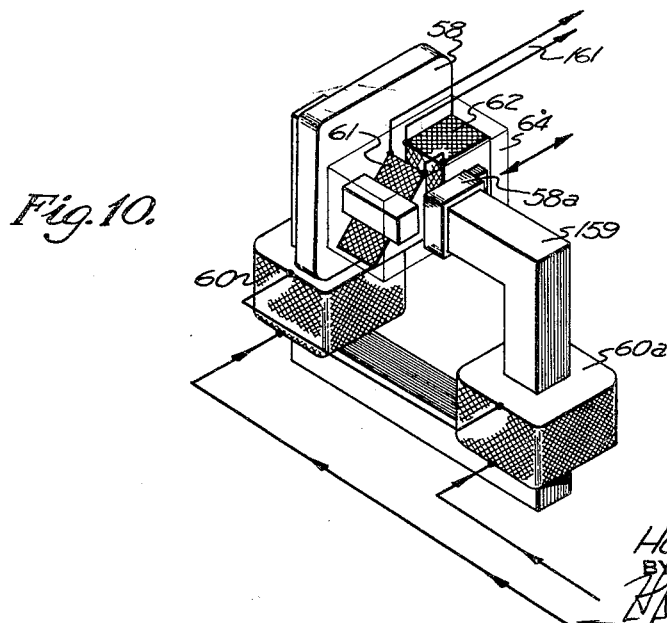
Figure 4:
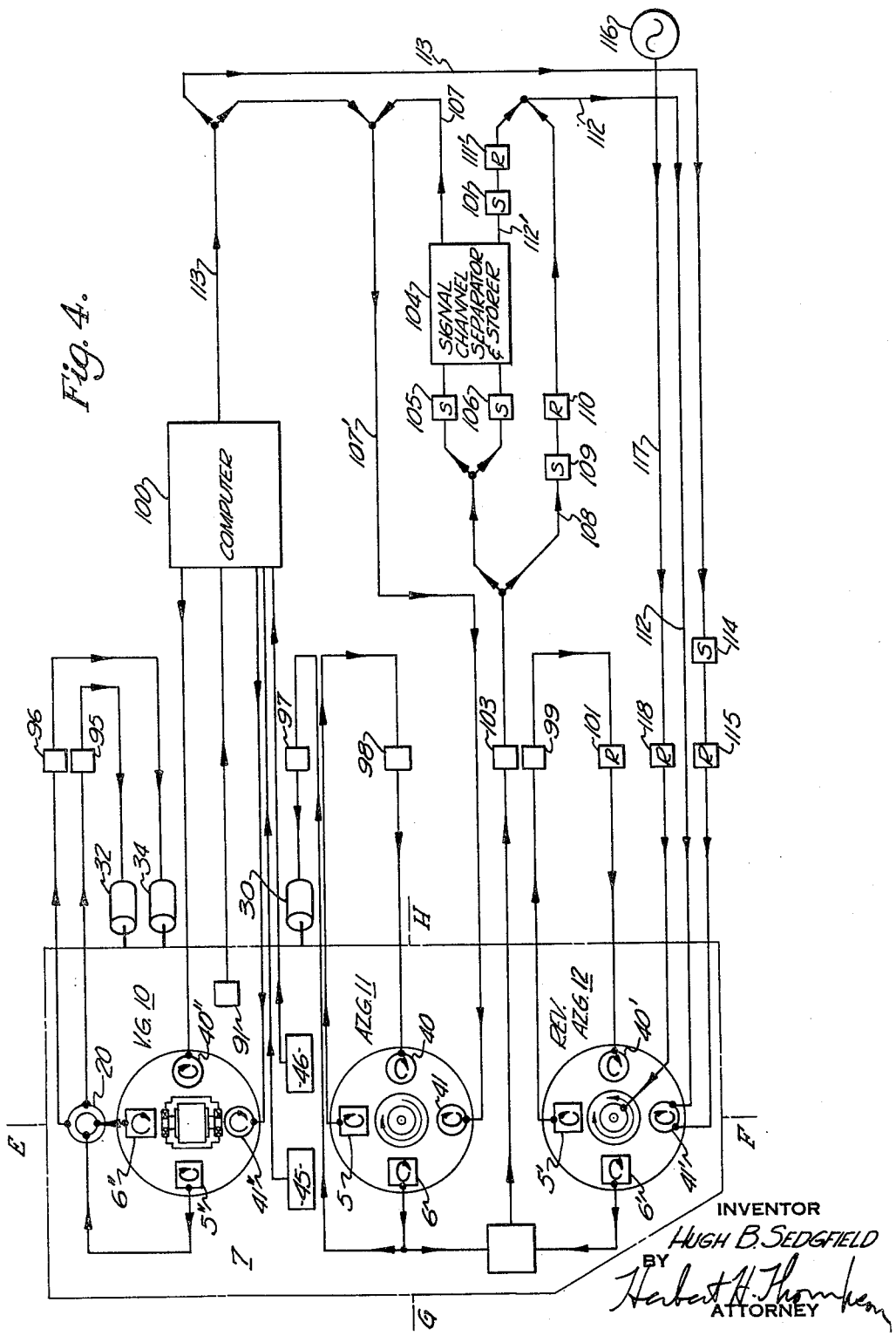
Figure 5:
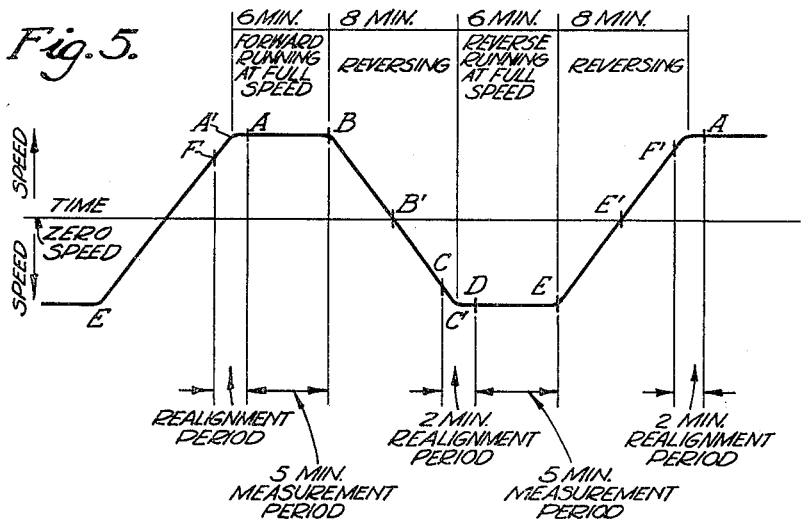
Figure 6:
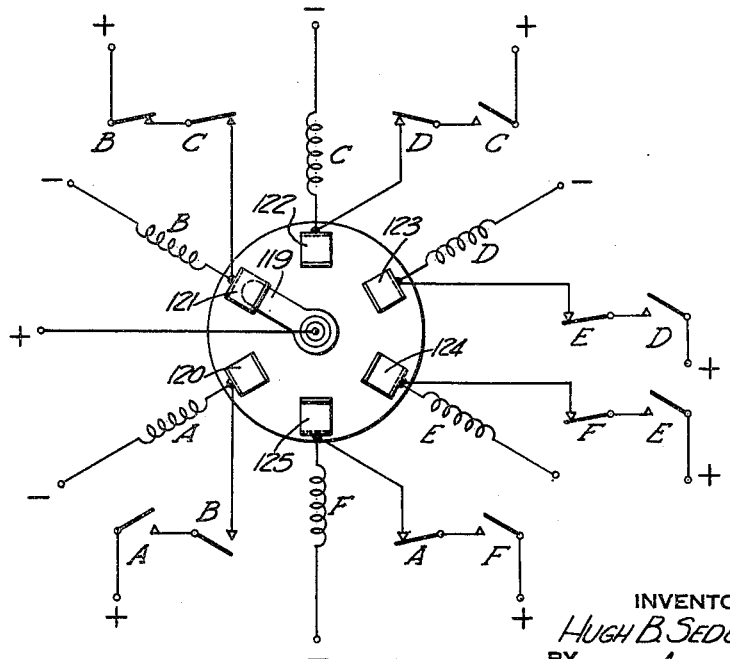
Figure 7:
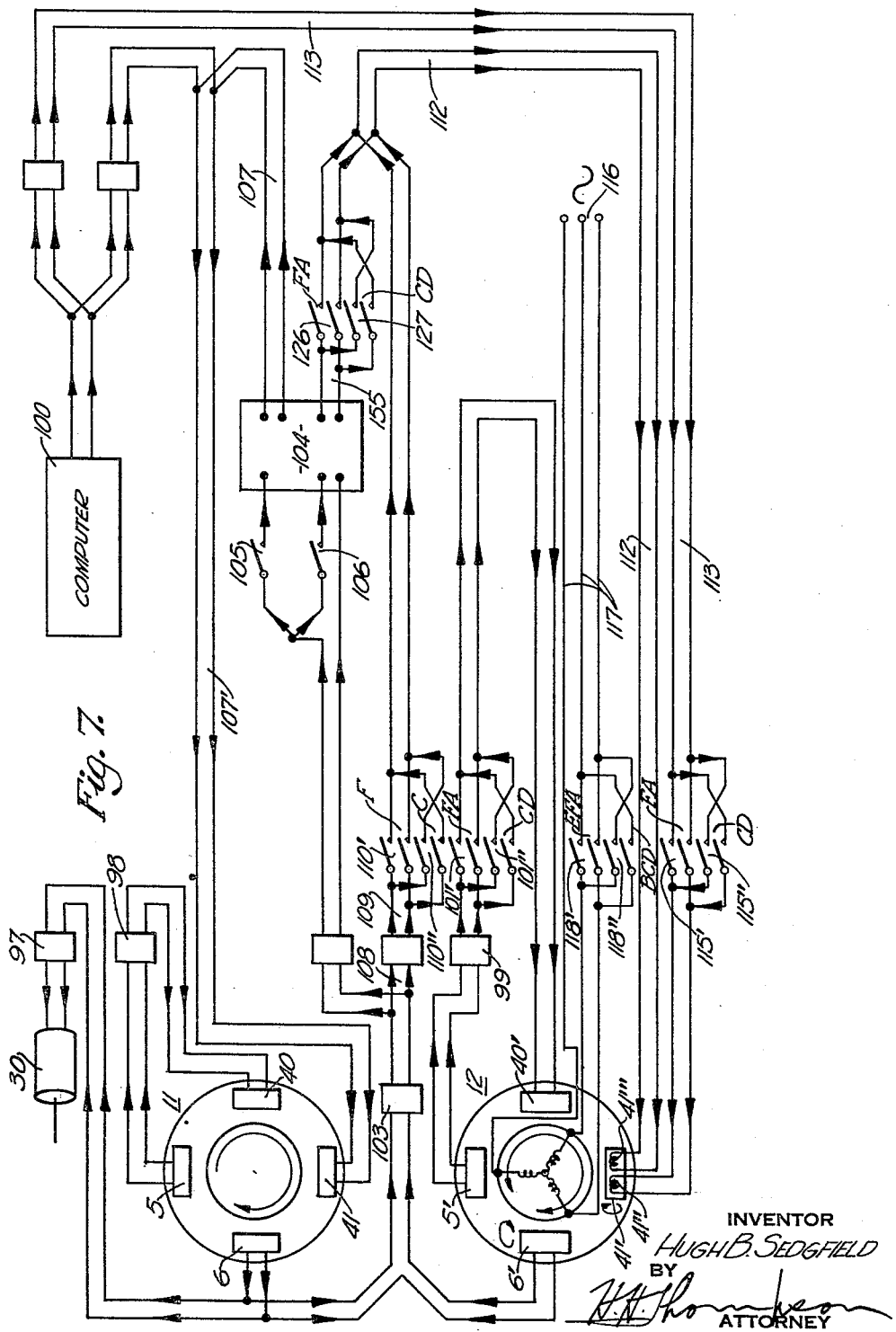
Figure 8:
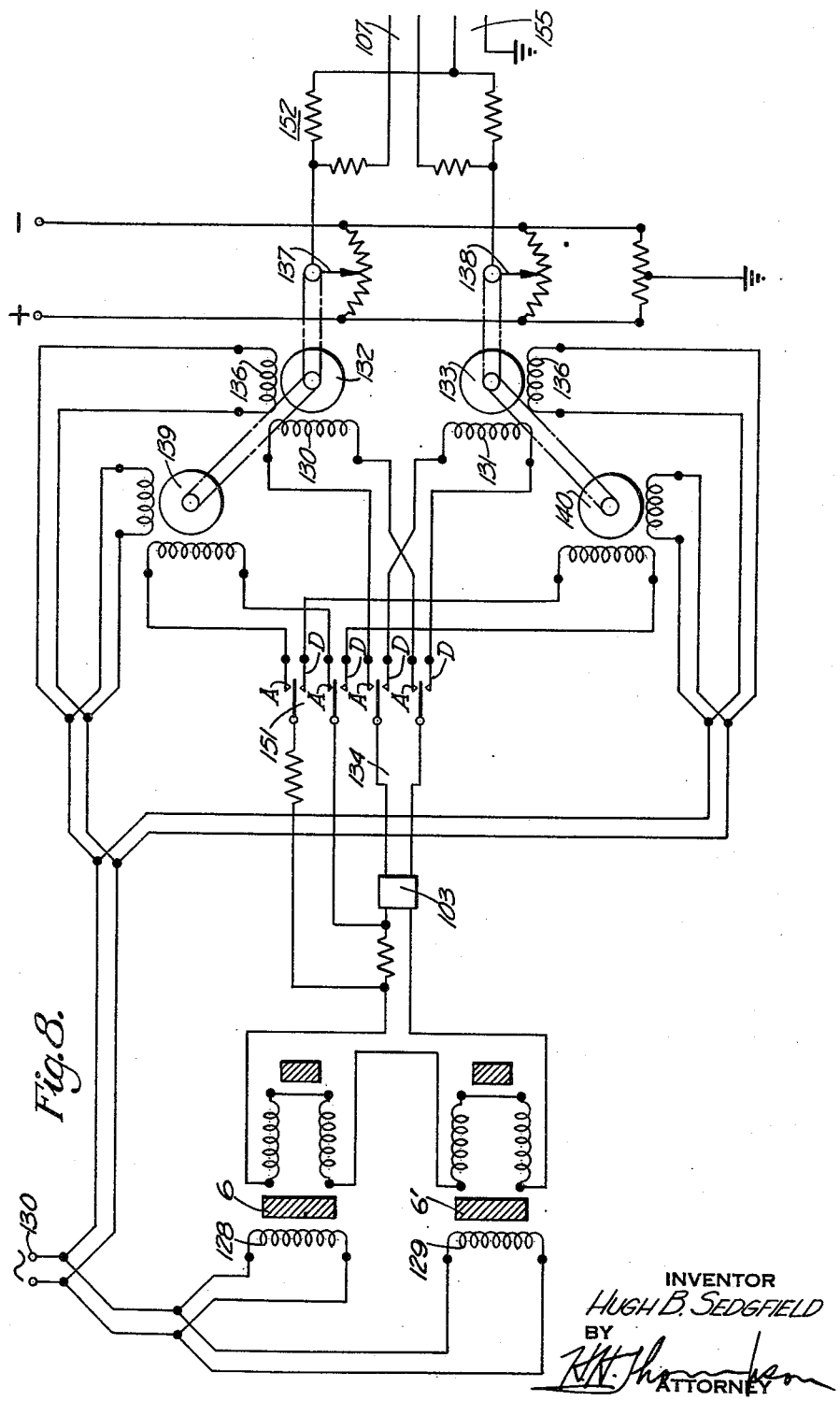
Figure 9:
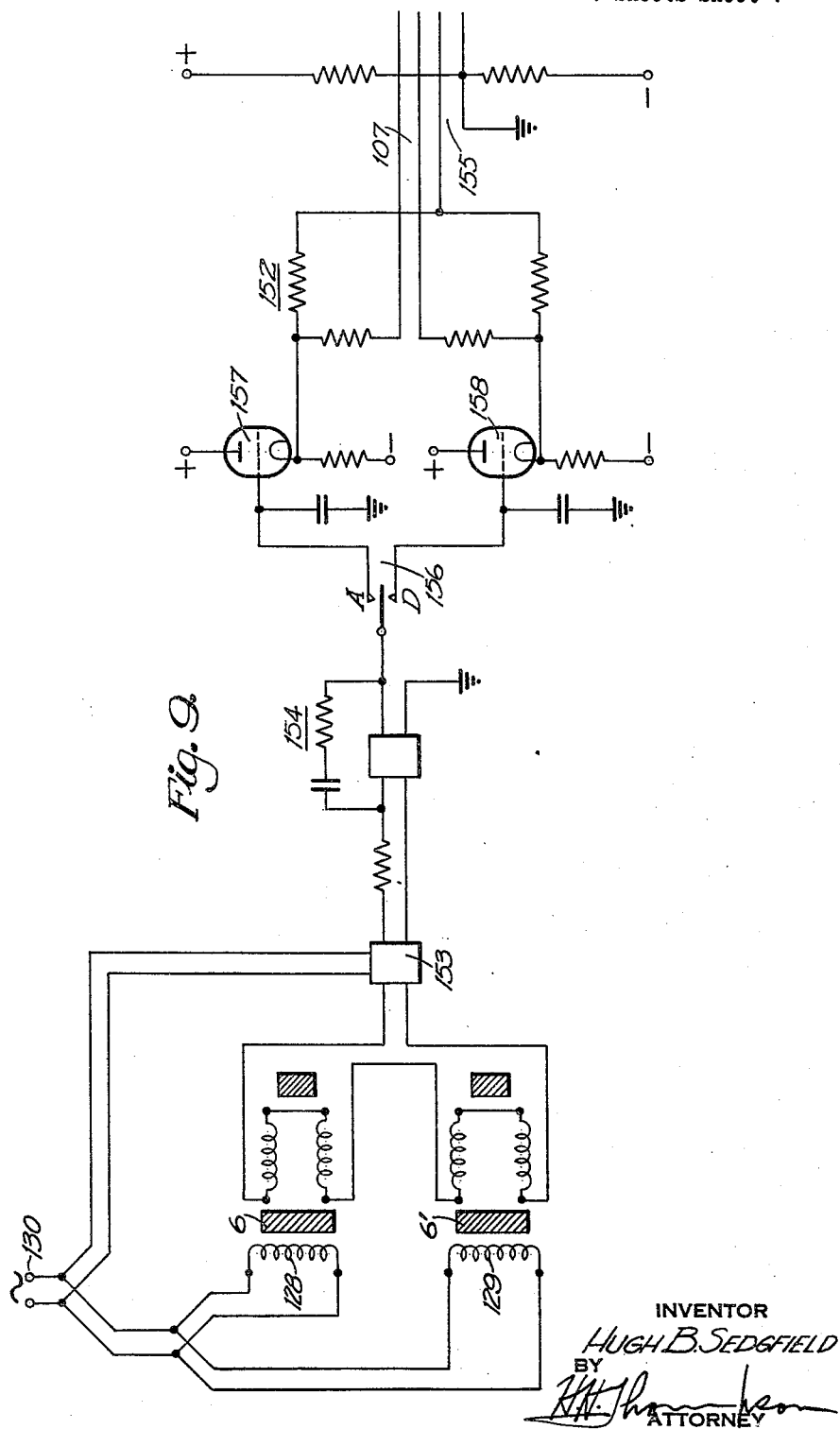

FIGURE 4 is a diagrammatic circuit diagram showing the inter-relation of parts and the functional operation of a complete gyroscopic system incorporating the stabilised platform of the kind illustrated in FIG. 1 as applied to provide navigational information and incorporating one embodiment of the present invention, FIGURE 5 is a graph showing one cycle of operation of the reversible gyroscope, FIGURE 6 illustrates diagrammatically a six pole rotary switch, FIGURE 7 is a more elaborate circuit diagram showing part of the circuit diagram of FIG. 4, FIGURE 8 is a circuit diagram showing the inter-connection between the pick-off devices and the channels supplying the torque motors and showing one form of signal channel separator and storer, FIGURE 9 is a similar diagram to FIG. 8 but illustrating another form of signal channel separator and storer, FIGURE 10 is an isometric projection of one form of pick-off device that may be utilised.

Figure 2:
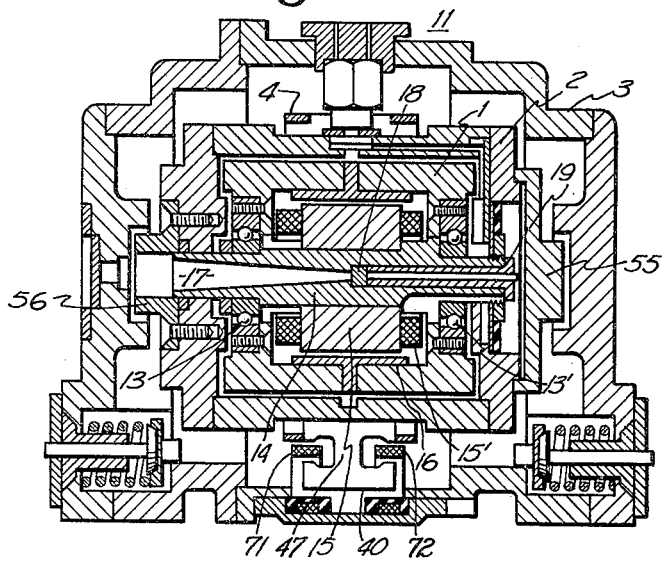
FIGURE 2 is a sectional view through the rotor axis of one of the gyroscopes on the platform of FIGURE 1.
Figure 3:
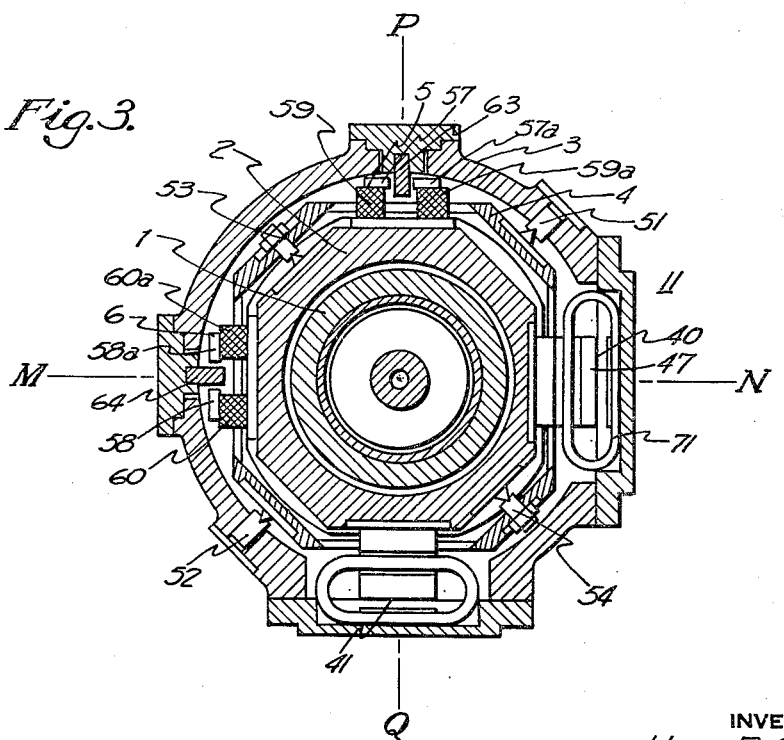
FIGURE 3 is a sectional elevation through a plane perpendicular to the rotor axis of the same gyroscope as FIGURE 2.

Referring to FIGURES 1, 2 and 3 in the drawings, a platform 7 is mounted with angular freedom of movement about three mutually perpendicular axes GH, JK and EF in a support 23 by means of two gimbal rings, vertical gimbal ring 8 and a horizontal gimbal ring 9. The platform carries a gravity-controlled vertical-axis gyroscope 10 for maintaining a reference line parallel to the axis EF in the platform vertical and a horizontal-axis gyroscope 11 for stabilising the platform in azimuth about the axis EF. The platform 7 also supports a further horizontal-axis or directional gyroscope 12 which is of the reversible kind and is connected with the other horizontal axis or directional gyroscope 11 in such a manner as to reduce the systematic wander of the gyroscope 11 in a manner to be described in greater detail hereinafter.

The gyroscope 12 will hereinafter be referred to as the reversible gyroscope and the gyroscope 11 will hereinafter be referred to as the auxiliary gyroscope. All three gyroscopes are of the non-erratic kind as hereinbefore defined.

Each gyroscope is substantially of the kind described in the aforesaid application No. 147,444 and accordingly only the gyroscope 11 will be described. The gyroscope 11 comprises an electrically driven rotor 1 mounted for spinning in a rotor case 2 which is in the form of a figure of revolution about a principal axis of symmetry. The rotor case 2 is totally immersed in mercury which buoyantly supports the weight of the rotor case 2 and the contained rotor 1, the mercury being contained in and filling a hollow float chamber 3 rigidly fixed in or to the platform 7. The rotor 1 and the rotor case 2 are both made of the same material which is a heavy metal such as tungsten alloy. The rotor is hollow and is mounted for rotation about the principal axis of symmetry of the rotor case in bearings 13, 13′, the inner races of which are fixed to a tube 14 fixed to the rotor case.

The rotor 1 is electrically driven by means of an electric motor comprising a stator 15 and windings 15′ in the interior of the hollow rotor mounted on the tube 14, and an eddy current ring 16 fixed to the rotor 1.

Three phase alternating current is fed to the stator winding 15′ by means of leads (not shown) passing through the aperture 17 along the tube 14. One side of the tube 14 is open to the float chamber and mercury, therefore, enters and fills this side, but a rubber bung 18 held in place by a clamping screw 19 prevents it from entering the other side of the tube 14 which is open to the interior of the rotor case. In order to centralise the rotor casing in the other chamber, auxiliary supporting means are provided consisting of an auxiliary gimbal frame 4, external to the rotor case 2, pivotally mounted in the float chamber 3 in bearings 51, 52, within which frame the rotor case 2 is pivotally mounted in the bearings 53, 54 about an axis perpendicular to the axis of the bearings 51, 52. These two axes intersect at the centre of symmetry, and therefore of buoyancy of the rotor case, and in the case of the gyroscopes 11 and 12 both axes are disposed in a vertical plane parallel to a plane containing the axes EF and GH. In the case of the gyroscope 10 these axes are in a horizontal plane parallel to a plane containing the axes GH and JK.

Referring again to FIGURES 2 and 3 the rotor case is, by means of the gimbal suspension, able to oscillate about any axis normal to the spin axis of the rotor. However, only a small amount of relative angular movement between the rotor case and the float chamber is required in operation and excessive movement is prevented by stops such as those shown at 55 and 56. Since the weight of the rotor and the rotor case is supported by the mercury the bearings 51, 52 and 53, 54 are loaded by only small residual forces and may, therefore, be designed to be substantially frictionless. Furthermore a gyroscope constructed in accordance with the present embodiment will be substantially free from shifts of its centre of gravity. Thus the gyroscope is substantially free from erratic wander rates.

The gyroscope 11 is provided with a pair of pick-off devices 5 and 6 in the float chamber 3. The pick-off devices are arranged to detect and provide output signals measuring relative displacement each about one axis normal to the spin axis of the gyroscope between the float chamber 3 and the rotor case 2 supported in it, displacement being measured from a zero position in which the pick-off devices give zero output signals signifying correct alignment. The line in the float chamber with which the rotor axis of the gyroscope 11 coincides when the rotor case is in correct alignment as judged by the outputs from the two associated pick-off devices being both zero, defines a reference line which may be regarded as being a line in the platform 7. Arrangements, more fully described hereinafter, are provided for controlling the platform 7 is such a manner that the device of the pick-off devices 5 and 6 are maintained substantially zero and therefore, so that the reference line defined by the line in the float chamber assumes the same direction as the rotor axis of the gyroscope. The rotor axis of the gyroscope 11 is initially set horizontal and in the north/south direction and thereafter maintained substantially in the same direction by control arrangements and, therefore, the system operates to maintain the reference line defined by the line in the float chamber 3 substantially horizontal and in the north/south direction. This line is, therefore, hereinafter referred to as the horizontal north/south reference line.

Similarly, the rotor axis of the gyroscope 10 is initially set vertical and thereafter maintained substantially vertical by control arrangements as described more fully hereinafter, and therefore the system operates to maintain the reference line defined by the line in the float chamber 3 substantially vertical, this line is therefore hereinafter referred to as the vertical reference line.

Each of the pick-off devices 5, 6 comprises a primary element fixed to the rotor case and a secondary element 63 (or 64) fixed to the float chamber. Each primary element consists of a core of magnetic material including pole pieces such as those shown at 57, 57a, 58 and 58a in gyroscope 11, facing each other across a substantial air gap. Mounted on this core are windings 59 and 59a (60 and 60a) which are energised by alternating current supplied over the same leads as the current for the motors driving the gyro rotors. Thus an alternating magnetic field in produced across the gap between the pole pieces 57 and 57a (or 58 and 58a). Each secondary element 63 (or 64) is situated in the gap between the pole pieces of the core, and carries two windings (such as those shown at 61 and 62 in gyroscope 10) having their axes side by side and directed along the direction of the magnetic flux between the pole pieces. These windings are connected in series opposition so that the E.M.F.'s induced in them by the alternating magnetic flux will oppose each other. When the two windings of the secondary element are symmetrically disposed with respect to the magnetic field, they provide zero output signals, and the axis of the rotor coincides with the reference line in the float chamber. When, however, the axis and the reference line do not coincide, the coils of the appropriate pick-off or pick-offs will no longer be symmetrically located with respect to the magnetic field and the E.M.F. induced in one of the windings will be greater than that induced in the other, with the result that the pick-off will provide an output signal measuring, by its magnitude and phase sense, the magnitude and sense of the departure from alignment of the said axis and reference line.

Two torque motors 40, 41 are provided in each gyroscope to enable torques to be applied to the gyroscope about each of two axes through the centre of suspension and buoyancy of the rotor case which are mutually perpendicular and also perpendicular to the rotor axis, to cause desired precessions of the gryoscope about the other of the said two axes. These axes may therefore be referred to either as the torque axis or as the precession axes. They are indicated in the case of gyroscope 11 as M—N and P—Q in FIG. 3 and it is noted that each torque axis is inclined at an angle of 45° to both the axis of the bearings 51, 52 and the axis of the bearings 53, 54. So long as the system operates to maintain the vertical and horizontal north-south reference lines in their correct directions, torque axis M—N lies in the horizontal east-west direction, and torque axis P—Q is vertical. Torque motor 40 is located on the east-west axis M—N and serves to apply torques about the vertical torque axis P—Q. Similarly torque motor 41 is located on the vertical axis P—Q and serves to apply torques about the east-west torque axis M—N. Each torque motor comprises a permanent magnet core secured to the rotor case 2 and a pair of energisable coils rigidly secured to the float chamber 3, so that on appropriate energisation of the coils torques are applied between the float chamber and the rotor case. Each permanent magnet core is generally H-shaped, in cross section, and is mounted, as can be seen in the case of core 47, so that its plane of symmetry having this cross section lies in the radial plane containing the spin axis of the rotor and the torque axis on which it is located (that is, in the case of core 47, in the vertical east-west plane), the central link or yoke of the H section being directed outwards from the rotor axis. Each magnet core is so magnetised that both ends of one upright of the H section have one polarity and both ends of the other upright have the opposite polarity so that two air gaps are produced at the upper and lower ends of the H section in which the magnetic field runs in the same sense outwards from the rotor axis. The coils associated with the permanent magnets in each of the torque motors (40, 41) are of rigid construction. The coils 71 and 72 of motor 40 are visible in cross section in FIG. 2. As can be seen in the case of coil 71 the shape of the coils is generally rectangular the two longer sides being substantially straight and parallel and the two shorter sides curved outwardly. One of the parallel sides of each coil lies in the gap between the pole faces of its associated permanent magnet, so that when the coil is energised a force is produced between the rotor case and the float chamber in a direction at right angles both to the direction of the magnetic flux between the pole faces of the magnet and to the direction of the current flowing through the portion of the coils that lies in the gap between these faces. The two coils of each torgue motor are connected in series so that current flows in the same sense around both coils. Since the coils are disposed in parallel magnetic fields having the same sense the forces applied to the rotor case from the float chamber due to current in the two coils are additive. The resultant force operates to produce a torque on the gyroscope about one of the torque, or precession, axes through its centre of suspension and therefore to precess the gyroscope about the other torque or precession axis, namely that which passes through the motor. Torque motor 41, for instance, operates to precess the rotor and rotor case of gyroscope 11 about the east-west axis M—N.

As has been stated, the three gyroscopes are of identical construction. The gyroscope 12 is mounted on the platform 7 in such a manner that its gimbal axes are in a vertical plane coinciding with the vertical plane containing the gimbal axis of the gyroscope 11, the inner gimbal axes being parallel to each other and the other gimbal axes being parallel to each other. The gyroscope 12 is also provided with pick-off devices 5' and 6' (FIGURE 4) and torque motors 40', 41' (FIGURE 4). The vertical axis gyroscope 10 is mounted on the platform 7 with its gimbal axis in a horizontal plane and is controlled in such a manner that its axis is maintained vertical. The gyroscope 10 is also provided with pick-off devices 5", 6" (FIGURE 4) and torque motors 40", 41" (FIGURE 4).

The platform 7 is supported in an inner gimbal ring 8 for rotation about a first gimbal axis E—F which is parallel to the vertical reference line. The platform is mounted in bearings, the outer races of which are fixed in frameworks which are formed as parts of the ring 8. The inner gimbal ring 8 is supported in an outer gimbal ring 9 (FIGURE 1) for rotation about a second gimbal axis G—H which is located in the inner gimbal ring at right angles to the first gimbal axis E—F and which, therefore, in operation is horizontal. The outer gimbal ring 9 is supported in an outer framework 23 for rotation about the third gimbal axis J—K which is located in the outer gimbal ring at right angles to the second gimbal axis G—H. In this way the platform 7 has three degrees of freedom of angular movement with respect to the outer framework 23 which is all that is necessary to enable it to be maintained in fixed orientation, stabilised by the gyroscopes and by control actions exercised by the gyroscopes as hereinafter described, irrespective of angular motions of the outer framework 23. The outer framework 23 may therefore be fixed to a craft in which the gyroscopic system is to be used. Although other more elaborate mounting systems are possible it will be supposed that the framework 23 is fixed to the craft in such a manner that the axis J—K is parallel to the principal fore-and-aft or roll axis of the craft.

Electric currents are supplied to, and taken from, the various electrical devices mounted on the platform 7 through slip rings rigidly fixed to the platform and brushes, mounted on the frame 8. Similar sets of slip rings and brushes are provided for carrying the electric currents between the inner and outer gimbal rings 8 and 9 and between the outer gimbal ring 9 and the framework 23.

In FIG. 4 there is shown a schematic illustration of the platform 7 with the three gyroscopes 10, 11, 12 mounted on it. The pick-off devices 5, 6, 5', 6', 5", 6" and torque motors 40, 41, 40', 41' and 40", 41" are also shown. In the case of gyroscopes 11 and 12 the pick-off devices and torque motors are shown in their correct normal positions relative to the rotor axes but in the case of gyroscope 10 the pick-off device 6" and torque motor 41" are shown as displaced through 90° from the normal position. The platform is mounted for angular movement about the horizontal axis G—H and another horizontal axis perpendicular to the plane of the paper and also about the vertical axis E—F.

The function of the pick-off devices 5, 6, and 5", 6" will now be described in more detail with reference to FIGS. 1, 2, 3 and 4. The two pick-offs 5" and 6" mounted in gyroscope 10 detect angular displacement of the platform 7 from the position in which the rotor axis of gyroscope 10 is aligned with the vertical reference line. The pick-off shown at 6" provides an output $e_1$ that measures misalignment of the rotor axis and the vertical reference line in the east-west vertical plane containing the rotor axis. The second pick-off is mounted in such a position that it provides an output signal $e_2$ measuring misalignment of the same axis and the same line in the north-south vertical plane containing the rotor axis. The pick-off devices 5, 6 in gyroscope 11 likewise provide signals $e_3$ and $e_4$ measuring misalignment between the rotor axis and the horizontal north-south reference line in two perpendicular planes, pick-off 5 providing a signal $e_3$ measuring misalignment in the north-south vertical plane and pick-off 6 providing a signal $e_4$ measuring misalignment in the horizontal plane.

The signals $e_1$ and $e_2$ from the pick-offs in the gyroscope 10 are used to control servo motors 32 and 34 (FIGS. 1 and 4) which operate to rotate the gimbal rings 8 and 9, so as to cause the platform 7 to assume and to maintain its correct operational position in the north-south and east-west vertical planes—namely that in which the vertical reference line and therefore the gimbal axis E—F, is parallel to the rotor axis of gyroscope 10. Since the framework 23 may assume any position in azimuth with respect to the platform 7, the signals $e_1$ and $e_2$ cannot be applied direct to the servo control systems 95 and 96 (FIGS. 1 and 4) which control the servo motors 32 and 34 respectively. In order that the signals from each pick-off may be correctly apportioned between the two servo motors, they are fed to the servo systems operating them through a resolver. This resolver, as indicated at 20 in FIG. 4, comprises a stator element (not shown) and a rotor element (not shown) in inductive relationship, the stator element being fixed to the inner gimbal ring 8, and the rotor element being fixed to the platform 7. Each element has two distributed windings whose magnetic axes are at right angles.

The signals from the pick-offs in gyroscope 10 are applied to the two windings of the rotor element so that they produce a resultant alternating magnetic field representing the misalignment vector, in that the angular position of the field in azimuth is determined by the direction in azimuth of the misalignment plane and its magnitude is proportional to the misalignment angle between the vertical reference line and the rotor axis. The two windings on the stator element then measure the components of the misalignment vector in the plane of the gimbal ring 8 and in the vertical plane perpendicular thereto. These components are referred to herein as the transverse and fore-and-aft components of the misalignment vector respectively, and the outputs from the two windings of the stator element are referred to as the transverse and fore-and-aft misalignment signals. The values of these signals are respectively $$e_1 \cos A + e_2 \sin A \text{ and } e_1 \sin A - e_2 \cos A$$

where A is the azimuth angle between the two vertical planes containing the first gimbal axis E—F that are respectively parallel to the horizontal north-south reference line and normal to the second gimbal axis G—H. These misalignment signals $$e_1 \cos A + e_2 \sin A \text{ and } e_1.\sin A - e_2.\cos A$$

are applied as error signals to serve control systems 95 and 96 which control the servo-motors 32 and 34. Servomotor 32 is mounted on a platform 33 which is formed as a continuation of a web on one of the uprights of platform 23. The driving pinion 36 of this motor meshes with a gear wheel 37 fastened to a boss formed on the outer gimbal ring 9 by means of screws, one of which is shown at 38. Servo control system 95 operates motor 32 to rotate gimbal ring 9 about the third gimbal axis J—K in the sense to reduce the transverse misalignment signal $e_1.\cos A + e_2.\sin A$ towards zero. Servomotor 34 is mounted on a platform 35 which is integral with the outer gimbal ring 9. The driving pinion 39 of this motor meshes with a gear wheel 43 fastened to a boss formed on the inner gimbal ring 8 by means of screws, one of which is shown at 44. Servo control system 96 operates motor 34 to rotate gimbal ring 8 about the second gimbal axis G—H in the sense necessary to reduce the fore-and-aft misalignment signal $e_1.\sin A - e_2.\cos A$ towards zero.

The two servo control systems 95 and 96 may be of any known kind provided that they are accurate and fast acting and include provisions for damping oscillations. In operation the two servo systems co-operate to turn the first gimbal axis E—F in the vertical plane containing it and the second gimbal axis G—H and the vertical plane containing it and the third gimbal axis J—K respectively, until a rest position is attained in which both the error signals are zero. Since the first gimbal axis E—F is parallel to the vertical reference line in the gyroscope 10 it follows that this rest position is attained when the axis E—F is parallel to the axis of the rotor 1 in gyroscope 10. Thus the axis E—F is stabilised to be set substantially vertical. Control systems 95 and 96, however, do not determine in any way the angular position of the platform in azimuth about the axis E—F.

The azimuth position of the platform is determined by a third servo system 97 to which the azimuth-misalignment signal $e_4$ is applied as an error signal. Servo system 97 operates to control the azimuth servo motor 30 which is mounted on the platform 7. The driving pinion 31 of this motor meshes with a gear ring 29 which is fastened by means of screws (not shown) to a horizonal ring (not shown) formed integrally with the vertical inner gimbal ring 8. This third servo system is arranged to operate the motor 30 so that it turns the platform 7 about the axis E—F with respect to the gimbal ring 8 until the horizontal north-south reference line is in line with the rotor axis of gyroscope 11 in the horizontal plane. This position is indicated by reduction of the azimuth-misalignment signal $e_4$ to zero. Thus platform 7 is stabilised so that the horizontal north-south reference line is actually maintained horizontal and in the north-south direction to the extent that the rotor axis of gyroscope 11 is maintained truly horizontal and in the north-south direction. The output signal $e_3$ from pick-off 5 in gyroscope 11, which, as stated above, is a measure of misalignment between the rotor axis of gyroscope 11 and the horizontal north-south reference line in the north-south vertical plane, is applied as an input to an amplifier 98 which operates the torque motor 40. As explained above, torque motor 40 operates to precess the rotor and rotor case of gyroscope 11 about the axis M—N. The amplifier 98 is arranged so that this precession is in such a sense as to reduce misalignment between the rotor axis and the reference line until the output signal $e_3$ is reduced to zero. In this manner the rotor axis of gyroscope 11 is maintained horizontal to the extent that the rotor axis of gyroscope 10 is maintained truly vertical.

The function of the gyroscope 12 and its pick-off devices 5', 6' and torque motors 40', 41' will be described later.

On the platform 7 two accelerometers 45 and 46 are mounted so as to be responsive to horizontal accelerations in the north-south and east-west directions respectively. These accelerometers are substantially of the kind described and claimed in co-pending applications No. 151,068 of applicant, Marcus Lionel Jofeh and Rudolf Albrecht, filed March 22, 1950, and now Patent No. 2,869,851, for Apparatus Adapted to Measure Accelerations and Inclinations, and No. 220,496 of applicant, filed April 11, 1951, and now Patent No. 2,888,256, for Accelerometers, and are designed to provide output signals very accurately proportional to whatever acceleration acts along the axis of response of the accelerometer. A third accelerometer 91, FIG. 4, may also be mounted on the platform to be responsive to vertical accelerations.

On the assumption that the apparatus operates as intended to maintain the platform 7 in such a position that the vertical reference line is truly vertical and the horizontal north-south reference line is truly horizontal and in the north-south direction, it can be said that the two accelerometers 45 and 46 provide measures of the north-south and east-west horizontal components of the acceleration of the craft.

In FIG. 4 of the drawings the stabilised platform is shown as used in a navigational system as described and claimed in co-pending application of applicant, No. 215,221 filed March 13, 1951, and now Patent No. 2,953,303, for Integrating Systems Particularly for Use in Position-Indicating Navigation Systems. Navigational systems of this kind are designed to compute the instantaneous position of a moving craft by doubly integrating measurements of acceleration effected on the craft. It is assumed that it is required to obtain the position of the craft as specified in the earth's latitude and longitude co-ordinate system, i.e. in terms of $r$ the radial distance of the craft from the earth's centre, $\Phi$ the longitude of the craft and $\theta$ its latitude.

For this purpose three accelerometers 91, 45 and 46 are shown as being mounted on a stabilised platform to provide measurements of the acceleration of the craft in three mutually perpendicular directions, namely, $\alpha_1$ vertically upwards, $\alpha_2$ horizontally to the east and $\alpha_3$ horizontally to the north. If desired the accelerometer 91 may be replaced by a barometric or similar device which is capable of providing a measure of the height of the craft above the earth and apparatus for computing therefrom measures of the velocity and the acceleration of the craft in the vertical direction. These measures of the accelerations are applied to a computer 100 which computes from them the height, the latitude and the longitude of the craft, and as a step toward doing so it also computes the velocities $v_1$, $v_2$ and $v_3$ directed respectively vertically upwards, horizontally to the east and horizontally to the north.

The computer 100 is designed to take account of the fact that the accelerometers 91, 45 and 46 measure accelerations in directions, viz. vertically upwards, horizontally to the east and horizontally to the north, that are continuously changing relative to space, or to stellar axes, partly owing to the travel of the craft over the earth's surface and partly owing to rotation of the earth about its axis, and that the velocities $v_1$, $v_2$ and $v_3$ computed from these accelerations are likewise measured in the same continually changing directions. In other words, the computer takes account of the fact that the accelerations and velocities with which it deals are velocities and accelerations in rotating axes, the axes being the local vertical, the local horizontal easterly direction and the local horizontal northerly direction. It takes account of this fact by computing velocity components from the measured acceleration components according to the formulae for rotating axes, viz.

$$\left.\begin{array}{l}\dot{v}_1=\alpha_1-\omega_2 v_3+\omega_3 v_2\\ \dot{v}_2=\alpha_2-\omega_3 v_1+\omega_1 v_3\\ \dot{v}_3=\alpha_3-\omega_1 v_2+\omega_2 v_1\end{array}\right\} \quad A$$

where $\omega_1$, $\omega_2$, and $\omega_3$ are the component angular velocities or spins of the local co-ordinate axes about their own directions due to travel of the craft. In producing the necessary modifying quantities for deriving the quantities $\dot{v}_1$, $\dot{v}_2$ and $\dot{v}_3$ from the accelerations $\alpha_1$, $\alpha_2$, and $\alpha_3$, the computer 100 also derives quantities measuring the spin components $\omega_1$, $\omega_2$ and $\omega_3$.

In the case of the co-ordinate system considered, the velocity and spin components may be expressed in terms of the co-ordinates $r$, $\Phi$ and $\theta$ and of the angular velocity $\Omega$ of the earth about its axis by the following equations:

$$\left.\begin{array}{l}v_1=\dot{r}\\ v_2=r(\dot{\Phi}+\Omega)\cos\theta\\ v_3=r\dot{\theta}\end{array}\right\} \text{B}$$

$$\left.\begin{array}{l}\omega_1=(\dot{\Phi}+\Omega)\sin\theta\\ \omega_2=(\dot{\Phi}+\Omega)\sin\theta\\ \omega_3=-\dot{\theta}\end{array}\right\} \text{C}$$

Thus the measures of the acceleration components $\alpha_1$, $\alpha_2$ and $\alpha_3$ are modified in the computer by the addition of rotated-velocity components in order to convert them into measures $\dot{v}_1$, $\dot{v}_2$ and $\dot{v}_3$ of the rate of change of the corresponding velocity components. These measures are then integrated to provide computed values $v_1$, $v_2$ and $v_3$ for these velocity components. This modification of the measures of the acceleration components is carried out by applying forces to the accelerometer proportional to the modifying terms in the manner described and claimed in the co-pending aforesaid application of applicant, No. 220,496.

In the system of the present invention, currents proportional to the computed angular velocity components $\omega_1$, $\omega_2$ and $\omega_3$ are utilised to maintain the stabilised platform in the correct relation to the local system of co-ordinate axes in spite of movements of the craft over the earth's surface and the rotation of the earth. To this end a current proportional to the spin component $\omega_1$ is fed to the torque motor 41 in gyroscope 11 to cause precession of that gyroscope in the horizontal plane at an angular velocity equal to $\omega_1$; a current proportional to $\omega_2$ is fed to torque motor 41″ in gyroscope 10 to cause precession of that gyroscope in the east-west vertical plane at an angular velocity equal to $\omega_2$; and a current proportional to $\omega_3$ is fed to torque motor 40″ in gyroscope 10 to cause precession of that gyroscope in the north-south vertical plane at a velocity equal to $\omega_3$.

On the assumption that the platform is correctly stabilised and oriented at an initial instant, that the outputs of the accelerometers 91, 45 and 46 are accurate measures of the components of the acceleration of the craft along the three local co-ordinate axes and that the computer 100 computes accurately according to the formulae above, the computer values $\omega_1$, $\omega_2$ and $\omega_3$ for the angular velocity components of the co-ordinate axes are just the rates at which the rotor axes of the gyroscopes 10 and 11 should be precessed to keep them parallel to the local co-ordinate axes. On the assumption that the torque motors 41″, 41 and 40″ operate accurately, the gyroscopes 10 and 11 are precessed at just these correct rates and, therefore, continue to define the true local vertical and the true north direction as the craft travels over the earth's surface.

It is clear, therefore, that the whole system thus far described with reference to FIG. 4 is a closed-circuit control system comprising a number of closed-circuit control sub-systems as parts of it. It follows that, if all the parts operate accurately, it is capable of having as a steady state solution of its equations of motion one in which the gyroscopes 10 and 11 accurately maintain the local vertical and horizontal true north directions respectively. Consequently, if the gyroscopes 10 and 11 are initially set correctly and if no continuous disturbing cause is operating, such as a torque liable to precess one of the gyroscopes, or a systematic error in the operation of a part of the system, the gyroscopes 10 and 11 will continue to maintain the local vertical and local true north directions. If there is a small initial error in setting the gyroscopes the system will execute slow oscillations with a period of 84 minutes about the steady state condition, so that the directions of the axes of the gyroscopes 10 and 11 will oscillate at this period about the local vertical and the local meridian. If, on the other hand, a disturbing cause is operating, liable by itself to cause the gyroscopes to wander if the circuit of the complete closed-loop control system is broken, then on completion of the system into a closed loop the oscillation will again develop, even if the initial setting is correct, with such an amplitude that the rate of maximum precession of the gyroscope is equal to the initial wander-rate.

Any known means may be used for initially setting the system, either on land before the start of the craft's journey, or optically by comparison with astronomical references so that the gyroscope axes are respectively very accurately vertical and in the direction of true north.

Systematic errors in the operation of the system are reduced by use of the highly accurate accelerometers described in the aforesaid co-pending application No. 151,068. Similarly, the follow-up servo systems and the computer may be so designed as to be highly accurate.

Oscillations due to initial wander-rate can also be rendered very small by modern, known techniques. The gyroscopes, for example, described in co-pending application No. 147,444 have a very low wander-rate. In order to reduce the wander rate still further the third reversible-spin gyroscope 12 is provided. As has been stated this gyroscope 12 is identical in construction with gyroscope 11 and is provided with the pick-off devices 5′, 6′ for detecting angular movement of the rotor case about two axes parallel to the two axes about which the pick-off devices 5, 6 of gyroscope 11 detect angular movement. The output of the pick-off device 5′ is applied through amplifier 99 and a reversible switch 101 to torque motor 40′ to keep the axis of the rotor of the gyroscope 12 horizontal to the extent that the rotor axis of gyroscope 10 is maintained vertical. The purpose of the reversible switch 101 is to reverse the sense of the signal applied to the torque motor 40′ when the direction of spin of the gyroscope 12 is reversed as will hereinafter be described in greater detail.

The gyroscope 11 is a high-accuracy gyroscope employing a suspension that renders is substantially free from disturbing torques of the kind that give rise to erratic wander. However, such a gyroscope is still liable to wander continuously in one direction at a substantially constant rate to produce cumulative wandering of the reference line provided by it. The gyroscope 12 is also a high-accuracy gyroscope employing a suspension that renders it free from disturbing torque of the kind that gives rise the erratic wander. It also is liable to wander continuously in one direction at a substantially constant rate if its direction of spin is maintained constant in direction. However, according to the invention its direction of spin is periodically reversed, so that its direction of wander also periodically reverses. The average wander rate of the reversible gyroscope 12 is therefore substantially zero and it may be regarded as a primary direction-giving instrument for initially setting and subsequently monitoring the auxiliary gyroscope 11. Apparatus to be hereinafter described is provided for comparing and measuring the extent to which the gyroscope 11 wanders relatively to the reversing gyroscope 12 in a "measuring" period in which the rotor of the gyroscope 12 is spinning in one direction with the extent of the wander of the gyroscope 11 relative to the gyroscope 12 in a corresponding "measuring" period in which the rotor is spinning in the reverse direction. In one of these periods the two gyroscopes will be wandering in the same direction, each at its own characteristic rate, so that the relative wander rate in this period will be the difference between the two characteristic rates. In the other period the two gyroscopes will be wandering in opposite directions each at its own characteristic rate so that the relative wander rate in this period will be the sum of the two characteristic rates. The algebraic mean of the two values found for the wander rate of the auxiliary gyroscope 11 relative to the reversing gyroscope will then be a measure of the absolute wander rate of the auxiliary gyroscope 11. If this absolute wander rate is known it will be possible to energise the torque motor 41 of the gyroscope 11 by the right amount to compensate for, and neutralise, the systematic disturbing torque that is causing it to wander at the ascertained rate.

For this purpose the output of the pick-off device 6' of the reversing gyroscope 12 is applied differentially with the output of pick-off device 6 of gyroscope 11 through amplifier 103 to a signal channel separator and storer 104 (FIG. 4). Switches 105, 106 are provided for supplying the misalignment signal to the device 104 in dependence on whether the rotor of gyroscope 12 is spinning in one direction or the other. The device 104 in the present embodiment serves to obtain from its inputs the time integrals of the misalignment signals, and to store them to provide as output signals the sum and difference of these measures. The sum of the measures, which is a measure of the absolute wander rate of the gyroscope 11, is supplied along the channels 107, 107' to the torque motor 41 to neutralise the disturbing torque acting on the gyroscope 11. The difference of the measures, which is a measure of the wander rate of the gyroscope 12, is supplied along the channel 112', through switch 101, reversing switch 111', channel 112 to the torque motor 41' to neutralise the disturbing torque acting on the gyroscope 12. The compensating torques applied to the torque motors 41, 41' are applied during the measuring periods.

The torque motor 41' of the gyroscope is also supplied during the measuring periods with a signal proportional to the spin component ω derived from the computer 100 along the channel 113 and through the switch 114 and reversing switch 115.

The motors for driving the rotors of the three gyroscopes are A.-C. motors of types that become synchronous when their speed approaches synchronous speed and the alternating current source energising the rotor is preferably frequency controlled. The motor of the reversible gyroscope 12 is shown as being energised from the three-phase supply 116 along channel 117 through reversing switch 118.

Although in theory the reversing gyroscope should not wander during the changing speed periods once the compensating torque has been developed and applied to it it is best not to rely on this because of the extreme liability of the gyroscope to precess readily at irregular wander rates in response to any slight unbalanced disturbing torque when the rotor spin velocity is very low, and thus to diverge appreciably from alignment with the auxiliary gyroscope. It is therefore preferable to confine the measuring periods (for determining the compensating torques to be applied) to those parts of a cycle of operation of the reversing gyroscope in which the rotor of that gyroscope is spinning at its steady maximum speed.

It is also preferable to provide means for centralising the reversing gyroscope to a predetermined angular position with respect to the auxiliary gyroscope 11, preferably to a direction in which its spin axis is parallel to the spin axis of the auxiliary gyroscope before the beginning of each measuring period. For this purpose it is convenient to apply alignment torques to the reversing gyroscope after its rotor has been retarded and stopped and either when it is accelerating again in the reverse direction or after it has reached full speed in the reverse direction to cause the reversing gyroscope to precess into alignment with the auxiliary gyroscope. Thus in the drawings the misalignment signal from the amplifier 103 is applied along the channel 108 through the switch 109 and reversing switch 110, along channel 112 to the torque motor 41'.

In FIGURE 5 there is shown a graph of one complete cycle of operation of the reversing gyroscope. During the period A'B of the cycle the reversing gyro is rotating in one direction at full speed and during a period AB, called the measurement period, misalignment information is provided to the device 104 in FIGURE 4 from the amplifier 103. At the point B the driving torque to the gyroscope rotor is reversed and the rotor comes to a standstill at B' and then reverses its direction of spin until, at a point C', it has reached its maximum speed in the reverse direction. During the period CD the reversing gyroscope 12 is realigned with the auxiliary gyroscope 11 by connecting the output from the amplifier 103 to the torque motor 41' through the channel 108, 112, if the gyroscopes have become misaligned during the period when the rotor was spinning at a low speed. During the period CE the gyroscope is rotating at its maximum speed in the reverse direction and during the period DE, the measuring arrangement is again in operation. At E, the driving torque is again reversed so that the rotor reduces speed until it comes to a standstill at E' and then rotates in the opposite direction until it reaches its maximum speed in the original direction at F'. During the period FA, the realignment device is again in operation to realign the gyroscope 12 to the gyroscope 11 should they have become misaligned during the period when the rotor is spinning at a low velocity.

In FIGURE 6, there is shown a six pole rotary switch for operating the various switches brought into operation during a cycle of operation. The switch is controlled to make one complete revolution for one cycle of operation. The switch comprises a rotatable contactor 119 which is continuously rotated at a constant speed by a motor (not shown) so that it engages each of the contacts 120, 121, 122, 123, 124 and 125 connected to the windings of relay-operated switches A, B, C, D, E, F, in turn. These windings are appropriately energised when the contacts are made from a D.-C. source as shown. Each relay circuit has a switch in it which is normally made but is broken when the contact 119 reaches the next contact in its direction of travel. Thus in the illustration of FIGURE 6 the contactor 119 is in contact with the contact 121 thereby energising the winding B to make the switch B. In the circuit to the winding B there is a switch C which is normally made but which is broken when the contact 119 reaches contact 122. Thus, during the period when the circuit is broken between the contacts 121 and 122, the winding of relay B holds the switch B closed. The other circuits operate similarly and need not be further described. Generally each of the outside switches A, B, C, D, E and F of FIG. 6 is made in turn when the contacts 120, 121, 122, 123, 124, 125 are made and in turn each of the inner switches A, B, C, D, E, and F is broken when the contacts 120, 121, 122, 123, 124, 125 are made in turn. The contacts associated with the windings A, B, C, D, E and F are spaced apart in a circle in dependence on the various times forming the cycle of operation shown in FIGURE 5.

FIGURE 7 shows in greater detail the circuits for the two gyroscopes 11 and 12. It will be seen that a number of switches A, B, C, D, E and F are shown. Each switch is shown in its open position and each is arranged to be closed whenever the contactor 119 makes contact with the contact associated with the windings indicated by the letter identifying the switch. Thus, if a switch is marked AB, DE, it means that this switch is made whenever the contactor 119 comes into contact with contacts 120, 121, 123, 124 so that the switch is held closed during the measuring period AB, during the reversing period BC, during the measuring period DE and during the reversing period EF.

The operation involving the control of the gyroscope 11 by the reversible gyroscope 12 will now be described with reference to FIGURE 7 of the drawings, a complete cycle of operation being considered. The gyroscope 11 is rotating at its full speed. The contactor 119 has just left the contact 125 so that all the switches shown in FIGURE 7, except those marked F, namely, 110', 101', 118', 115', will be open. Since the switch 118' is closed, the gyroscope 12 will be forward running. The misalignment signal derived from the amplifier 103 is passed along the channel 108, through switch 110', along channel 112 to energise the winding 41''' of torque motor 41' in the appropriate sense to re-align the gyroscope 12 with the gyroscope 11. The signal in channel 113 from computer 100 is also effective on torque motor winding 41″ in the appropriate sense to produce controlled precession of gyroscope 12. A signal equal to that in channel 113 is continuously applied along the channel 107′ to the torque motor 41 of gyroscope 11 to produce precession of that gyroscope at the same controlled rate. When the contactor 119 reaches contact 120, all the switches marked A will be made and the others broken and a measuring period will commence. The misalignment signal appearing in the amplifier 103, which will be the difference of the wander signals from the pick-offs 6 and 6′ will be applied through the switch 105 to the storing device 104. During this period, pick-off 5′ and the torque motor 40′ may still be effective to level the gyroscope and the signal along the channel 113 from the computer 100 will be applied in the appropriate sense to energise the winding 41″ of the torque motor 41′ to produce controlled precession of the gyroscope 12.

When the contactor 119 reaches the contact 121 all the switches marked B will be made and the others broken. The forward running measuring period comes to an end and a reversing period commences. This means that the misalignment signal is cut off from the storing device 104 because neither of the switches 105 and 106 is made. The misalignment signal is also cut off from the torque motor 41′. The three phase source 116 is connected in the reverse sense to the gyroscope by the closing of switch 118″ and the opening of switch 118′. During this period the gyroscope 12, due to its loss of angular momentum, is liable to wander, but the amount of wander is very small in view of the mechanical restrictions provided by the follow-up system. Also the gyroscope 11 is liable to be controllably precessed by a signal from the computer 100 out of alignment with gyroscope 11. However, when the next contact C is made, a re-alignment period commences in which the gyroscope 12 is re-aligned with the gyroscope 11, this being effected by supplying the misalignment signal from the amplifier 103 through the switch 110″ to the winding 41‴ of the torque motor 41′. It is to be noted that the re-alignment signal is applied in a reverse sense, by means of the switch C, in relation to the sense in which it was applied during the re-alignment period commencing at F, this being necessary because the direction of spin of the gyroscope has been reversed.

When the gyroscope 12 has been re-aligned and the next contact D made, a further measuring period commences in which the misalignment signal from the amplifier 103 is applied through the switch 106, which is now closed, to the storer 104 where it is stored for comparison with the previously stored signal. It is to be noted that the stored signal during this period is a measure of the sum of the two signals from the pick-offs 6, 6′ since the "wanders" are in opposite directions.

At the end of this measuring period for reverse running of the gyroscope 12 contact E is made which opens switch 118″ and closes the switch 118′ so as to energise the gyroscope in the appropriate sense for forward running. At the same time the switch 115″ is opened so as to prevent energisation of the torque motor 41′ by the signal in the channel 113 and the switch 101″ is opened to prevent energisation of the torque motor 40′ by the signal from the pick-off 5′. Also, at this time, the misalignment signal is not fed through either of the switches 110′ and 110″ to energise the torque motor 41′. When the contact F is made the gyroscope 12 is now running in its forward direction and a re-alignment period begins to re-align the gyroscope 12 with the gyroscope 11, should it have wandered during the period EF when the gyroscope was being reversed or should the gyroscope 12 have been precessed out of alignment. As has been previously stated, the amount of wander that can take place during this period is restricted by the physical limitations imposed by the follow-up system. During the re-alignment period, torques will be applied to the winding 41″ of the torque motor 41′ due to the signal in the channel 113.

Furthermore, the misalignment signal from the amplifier 103 will not be utilised to energise the storer 104. The misalignment signal will, however, be supplied through the switch 110′ to the windings 41‴ of the torque motor 41′ to align the gyroscope 12 with the gyroscope 11.

The storer 104 provides means to be described in detail hereinafter for obtaining the sum and difference of the misalignment signals stored. The sum of the signals will be a measure of the wander or wander rate, since it is in wander for a predetermined period, of the gyroscope 11 and the difference of the signals will be a measure of the wander or wander rate, of the gyroscope 12 from initial set positions. The sum of the signals is continuously applied along the channels 107, 107′ to the torque motor 41 which applies a torque of the correct amount to nullify the rate of wander of the gyroscope 11. The difference between the two signals in the storer 104 is applied during the forward running, measuring and aligning periods through the switch 126 and during the reverse running measuring and aligning periods through the switch 127 to the channel 112 to energise the winding 41″ of the torque motor 41′ to counteract the wander rate of the gyroscope 12.

Referring now to FIGURE 8 of the drawings, which illustrates an arrangement for achieving this result, the two pick-off devices of the gyroscopes 11 and 12 are illustrated at 6 and 6′, the primary windings 128 and 129 being energised from an A.C. source 130. The differential output from the pick-offs 6, 6′ is applied to the amplifier 103 and thence to energise one or other of the control windings 130 or 131 of the motors 132, 133. The winding 130 is energised by the misalignment signal during the forward running measuring period commencing at A when the switch 134 is moved to its uppermost position by engagement of the contactor 119 with the contact 120 and the winding 131 is energised during the reversing running measuring period when the switch 134 is moved to its lower position by engagement of the contactor 119 with the contact 123. The primary windings 135, 136 of the two motors 132, 133 are energised from the source 130. The motors control the angular positions of the wiper arms of potentiometers 137, 138 and in order to produce angular movements of the wiper arms by amounts proportional to the control signal inputs to the two motors, two rotationally variable transformers 139, 140 are provided whose outputs are fed back during the appropriate periods controlled by the switch 151 as inputs to the amplifier 103. A summing and differencing circuit 152 provides outputs that are respectively measures of the sum and difference of the outputs of the potentiometers 137 and 138. The sum output is supplied along the channel 107 to energise the torque motor 41 of gyroscope 11 and the difference output is supplied along the channels 155 and 112 to energise the winding 41″ of the reversible gyroscope 12 for the purposes previously specified.

In another form of the invention rotationally variable transformers 139, 140 may be omitted and the motors 132, 133 may be arranged to control the potentiometers so as to provide output voltages that are time integrals of the input voltages to the motors.

Preferably, however, an arrangement is provided in which the misalignment signals and time integrals of these signals are stored and utilised. An embodiment of an arrangement employing this principle is illustrated in FIGURE 9.

The outputs from the two pick-off devices 6, 6′ are differentially applied to a phase sensitive rectifying amplifier 153 whose output is applied to an amplifier 154 of the kind that provides an output voltage that is a measure of the input voltage plus the time integral of the input voltage, this output voltage is applied through the switch 156 during the measuring period commencing at A and D to the cathode followers 157, 158 respectively. The cathode followers 157, 158 serve to provide stored signals, one of which is a measure of the misalignment signal and its time integral obtained during the measuring period commencing at A and the other of which is a measure of the misalignment signal and its time integral obtained during the measuring period commencing at D. The circuit 152 serves, as in the embodiment of FIGURE 8 to obtain the sum and difference of these two signals, the sum of the signal being applied along the channel 155 to energise the torque motor 41' of the reversible gyroscope 12 during the prescribed periods and the difference signal being continuously applied along the channel 107 to energise the torque motor 41 of the gyroscope 11.

A form of pick-off device is shown in greater detail in FIGURE 10. It comprises a primary element fixed to the rotor case of the gyroscope and a secondary element 64 fixed to the flat chamber or follow-up element. The primary element consists of a core 159 of magnetic material including pole pieces 58, 58a facing each other across a substantial air gap. Mounted on this core 159 are windings 60, 60a which are energized by alternating current from the source 130, thus an alternating magnetic field is produced across the gap between the pole pieces 58 and 58a. The secondary element 64 is situated in the gap between pole pieces of the core and carries two windings 61, 62 having their axes side by side and directed along the direction of the magnetic flux between the pole pieces. These windings are connected in series opposition so that the E.M.F.'s induced in them by the alternating magnetic flux will oppose each other, thus when the two windings 61, 62 are symmetrically disposed with respect to the magnetic field, they provide a zero output signal along the leads 161. When, however, the secondary element 64 is displaced relatively to the primary element, the coils 61, 62 will no longer be symmetrically located with respect to the magnetic field and the E.M.F. induced in one of the windings will be greater than that induced in the other with the result that an output signal will be provided in the leads 161 which is a measure in magnitude and phase sense of the magnitude and sense of the departure of the secondary element from the primary element.

Since many changes could be made in the above construction and many apparently widely different embodiments of this invention could be made without departing from the scope thereof, it is intended that all matter contained in the above description or shown in the accompanying drawings, shall be interpreted as illustrative and not in a limiting sense.

What is claimed is:

1. Gyroscopic positioning maintaining apparatus comprising two gyroscopes each of which has means for normally maintaining its spin axis horizontal, means for periodically reversing the direction of spin of one of said gyroscopes, means for providing a signal which is a measure of the rate of relative wander of the two gyroscopes during a first measuring period when the two gyroscopes are spinning at a constant speed in the same direction, means for providing a signal which is a measure of the rate of relative wander of the two gyroscopes during a second period during which the spin direction of the one of the gyroscopes is opposite to that of the other gyroscope, means responsive to said first and second signal means for producing a third signal that is a measure of the sum of the first two signals representing the rate of wander of the other of the gyroscopes, and a torque device controlled by the signal of said third signal means to exert a corrective torque on the other of the gyroscopes proportional to its rate of wander.

2. Gyroscopic apparatus as claimed in claim 1, including means responsive to said first and second signal means for producing a fourth signal that is a measure of the difference between the first and second signals and therefore a measure of the rate of wander of the one of the gyroscopes, and a second torque device controlled by the signal of said fourth signal means to exert a torque on the one of gyroscopes proportional to its rate of wander.

3. Gyroscopic apparatus as claimed in claim 1, including means for periodically centralizing the one of the gyroscopes in a predetermined angular relationship with respect to the other of the gyroscopes between each measuring period.

4. Gyroscopic apparatus as claimed in claim 1, including a receiver for storing the signals of said first and second signal means during the period of reversal of the spin direction of the one of the gyroscopes.

5. Gyroscopic apparatus as claimed in claim 1, including means for integrating the signal of said first signal means, means for integrating the signal of said second signal means, and a receiver for storing the signals of said first signal and second signal integrating means during the period of reversal of the spin direction of the one of the gyroscopes.

6. Gyroscopic apparatus as claimed in claim 1, including a horizontally stabilized platform on which the two gyroscopes are mounted, in which the platform is also mounted with angular freedom of movement in azimuth, and in which provision is made for controlling the platform so as to cause a horizontal line defined in it to be maintained parallel in azimuth to the azimuthal direction defined by the other of the gyroscopes.

7. Gyroscopic apparatus as claimed in claim 1, including a stabilized platform carrying the two gyroscopes, and wherein the other of the gyroscopes is provided with a pick-off device that is adapted to provide a wander signal that is a measure of the relative angular displacement of the gyroscope and a reference direction determined in the platform, and the one of the gyroscopes is provided with a pick-off device that is adapted to provide a wander signal that is a measure of the relative angular displacement of the gyroscope and a reference direction defined in the platform having a predetermined angular relationship with the first defined reference direction.

8. Gyroscopic apparatus comprising two substantially identical gyroscopes each mounted with freedom of angular movement about two mutually perpendicular axes, means for periodically reversing the direction of spin of one of the gyroscopes, means adapted to provide a signal that is a measure of the rate of relative wander of the gyroscopes about two corresponding axes for a first predetermined time interval during which the two gyroscopes are spinning at a constant speed in the same direction, means adapted to provide a signal that is a measure of the rate of relative wander of the gyroscopes about the same two axes for a second predetermined time interval during which the other of the gyroscopes continues to spin at the same speed and direction and the one of the gyroscopes is spinning at a constant speed in the reverse sense, means responsive to the signals of the first and second signal means providing a signal that is a measure of their sum and which is therefore a measure of the rate of wander of the other of the gyroscopes, and torque applying means, responsive to said sum deriving means, for applying wander correcting torques to the other of the gyroscopes.

9. Gyroscopic apparatus as claimed in claim 8, including means responsive to the first and second signal means providing a signal that is a measure of their difference and which is therefore a measure of the wander rate of the one of the gyroscopes, and torque applying means responsive to said difference deriving means for applying wander correcting torques to the one of the gyroscopes.

10. The combination in a gyroscopic apparatus of, a stabilized platform, a first gyroscope carried by the platform having an azimuth axis and a rotor spinning unidirectionally about a normally horizontal axis, a second gyroscope carried by the platform having an azimuth axis and a reversible rotor spinning about a normally horizontal axis, means for reversing the spin direction of the rotor of said second gyroscope, a pick-off at the azimuth axis of the first gyroscope providing a wander signal, a pick-off at the azimuth axis of the second gyroscope providing a wander signal, means for periodically operating said spin direction reversing means for the rotor of the second gyroscope, means for receiving the signals of the pick-offs of said gyroscopes operable to provide an output in accordance with the sum of the signals when the rotors are spinning in the same direction and operable to provide an output in accordance with the difference between the signals when the rotors are spinning in opposite directions, wander correcting means for torquing said first gyroscope in accordance with the sum output of said receiving means, and wander correcting means for torquing said second gyroscope in accordance with the difference output of said receiving means.

11. The combination claimed in claim 10 including first means for integrating the summing signal of said signal receiving means to provide a third signal, second means for integrating the difference signal of said signal receiving means to provide a fourth signal, means for feeding the signal of said first integrating means to the torque correcting means of the first gyroscope, and means for feeding the signal of said second integrating means to the torque correcting means of the second gyroscope.

12. Gyroscopic apparatus including a stabilized platform, a first directional gyroscope carried by said platform having a unidirectional spinning rotor, a second directional gyroscope carried by said platform having a reversible spinning rotor and a torque motor for precessing the same about its azimuth axis, means operable to maintain the spin axes of the gyroscopes in a horizontal plane, timing means operable to periodically effect reversal of the spin direction of the reversible rotor gyroscope, normally ineffective means providing a signal for operating said torque motor to maintain the gyroscopes in a predetermined azimuth relation, and means responsive to said timing means for rendering said azimuth relation maintaining means effective during the period in which the rotor of the second gyroscope is being reversed.

13. Gyroscopic apparatus including a stabilized platform, a first gyroscope carried by the platform having an azimuth axis and a unidirectional spinning rotor, a second gyroscope carried by the platform having an azimuth axis and a reversible spinning rotor, means for reversing the direction of spin of the rotor of the second gyroscope, timing means for periodically operating said rotor reversing means whereby the rotors of the gyroscopes spin in the same direction for a predetermined time, means operable when the rotors are spinning in the same direction to provide a signal in accordance with the sum of the azimuth wanders of the gyroscopes, and means correcting for azimuth wander of said first gyroscope responsive to the signal of said sum signal means.

14. Gyroscopic apparatus including a stabilized platform, a first gyroscope carried by the platform having an azimuth axis and a unidirectional spinning rotor, a second gyroscope carried by the platform having an azimuth axis and a reversible spinning rotor, means for reversing the direction of spin of the rotor of the second gyroscope, timing means for periodically operating said rotor reversing means whereby the rotors of the gyroscopes spin in the opposite direction for a predetermined time, means operable when the rotors are spinning in opposite directions to provide a signal in accordance with the difference between the azimuth wanders of the gyroscopes, and means for correcting for azimuth wander of said second gyroscope responsive to the signal of said difference signal means.

15. A gyroscopic navigating system for dirigible craft comprising a platform mounted on the craft with freedom about a vertical and two mutually perpendicular horizontal axes, means operable to stabilize the platform about its horizontal axes, means for maintaining a predetermined orientation of the platform about its vertical axis including a first gyroscope carried by the platform having an azimuth axis and a unidirectional spinning rotor, a second gyroscope carried by the platform having an azimuth axis and a reversible spinning rotor, means for reversing the direction of spin of the rotor of the second gyroscope, timing means for periodically operating said rotor reversing means whereby the rotors of the gyroscopes spin in the same direction for a predetermined time and spin in opposite directions for a predetermined time, means responsive to wander of the gyroscopes about their azimuth axes providing a signal in accordance with the sum of the extent of wander thereof when the rotors are spinning in the same direction and providing a signal in accordance with the difference in the extent of the wander thereof when the rotors are spinning in opposite directions, wander correcting means operable to torque said first gyroscope in accordance with the sum signal of said wander responsive means, and wander correcting means operable to torque said second gyroscope in accordance with the difference signal of said wander responsive means.

16. A system of the character claimed in claim 15, including normally ineffective means for exerting a torque on the second gyroscope to maintain the gyroscopes in a predetermined azimuth relation, and means responsive to said timing means during the period in which the rotor of said second gyroscope is being reversed for rendering said normally ineffective torquing means effective.

17. A system of the character claimed in claim 15, including means carried by the platform for deriving signals for compensating the system for the effect thereon of the velocity of the craft and the earth's rotation in a north-south direction and an east-west direction, means for feeding one of said compensating signals to the correction torquing means for the first gyroscope and means for feeding the other of said compensating signals to the correction torquing means for the second gyroscope.

18. A system of the character claimed in claim 15 in which platform stabilizing means includes a gyrovertical having an erecting torque motor; including means carried by the platform for deriving signals for compensating the system for the effect thereon of the velocity of the craft and the earth's rotation in a north-south direction, an east-west direction, and in a vertical direction, means for feeding the vertical direction signal of said compensating means to the erecting torque motor of the gyro vertical, means for feeding one of the other of said compensating signals to the correction torquing means for the first gyroscope, and means for feeding the remaining of the signals of said compensating means to the correcting torquing means for the second gyroscope.

References Cited in the file of this patent

UNITED STATES PATENTS

| 1,186,856 | Sperry | June 13, 1916 |
|---|---|---|
| 2,414,291 | Evans | Jan. 14, 1947 |
| 2,470,773 | Haskins | May 24, 1949 |
| 2,524,553 | Wendt | Oct. 3, 1950 |
| 2,566,305 | Beacon | Sept. 4, 1951 |
| 2,577,313 | Downing | Dec. 4, 1951 |
| 2,591,697 | Hays | Apr. 8, 1952 |